United States Patent
Nakajima

(10) Patent No.: US 10,110,770 B2
(45) Date of Patent: Oct. 23, 2018

(54) IMAGE FORMING APPARATUS FOR SELECTIVELY STORING PRINT DATA AND DISPLAYING ALERTS TO A USER

(71) Applicant: CANON KABUSHIKI KAISHA, Tokyo (JP)

(72) Inventor: Satoru Nakajima, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/877,721

(22) Filed: Oct. 7, 2015

(65) Prior Publication Data
US 2016/0105582 A1    Apr. 14, 2016

(30) Foreign Application Priority Data

Oct. 9, 2014    (JP) .................................. 2014-208406

(51) Int. Cl.
*G06F 3/12*    (2006.01)
*H04N 1/32*    (2006.01)

(52) U.S. Cl.
CPC ....... *H04N 1/32101* (2013.01); *G06F 3/1207* (2013.01); *G06F 3/1238* (2013.01); *G06F 3/1267* (2013.01); *G06F 3/1274* (2013.01); *G06F 3/1285* (2013.01); *G06F 3/1286* (2013.01); *H04N 2201/0094* (2013.01)

(58) Field of Classification Search
CPC . H04N 1/32101; G06F 3/1238; G06F 3/1274; G06F 3/1207; G06F 3/1267
USPC ....................................................... 358/1.15
See application file for complete search history.

(56) References Cited

U.S. PATENT DOCUMENTS

| 8,508,761 | B2* | 8/2013 | Hirakawa | G06K 15/00 |
| | | | | 358/1.14 |
| 2006/0023247 | A1* | 2/2006 | Yamakawa | G06F 3/121 |
| | | | | 358/1.14 |
| 2006/0268320 | A1 | 11/2006 | Bridges et al. | |
| 2007/0127051 | A1* | 6/2007 | Sakayama | G06F 21/608 |
| | | | | 358/1.14 |
| 2008/0180724 | A1* | 7/2008 | Selvaraj | G06F 3/1208 |
| | | | | 358/1.15 |

(Continued)

FOREIGN PATENT DOCUMENTS

| CN | 1046624 A | 10/1990 |
| CN | 1054679 A | 9/1999 |

(Continued)

*Primary Examiner* — Eric A Rust
(74) *Attorney, Agent, or Firm* — Canon U.S.A., Inc. IP Division

(57) ABSTRACT

If a storage period of data held in a holding unit elapses and the data is deleted from the holding unit after a user logs out of a job processing apparatus, the user cannot easily recognize that there is deleted data. A method for controlling the job processing apparatus includes holding in the holding unit a job associated with a user, storing in a first storing unit identification information for identifying a user associated with a job deleted from the holding unit, storing in a second storing unit identification information for identifying a user associated with a job of which holding in the holding unit has failed, notifying based on the identification information stored in the first storing unit a user that the job is deleted, and notifying based on the identification information stored in the second storing unit a user that the holding of the job has failed.

9 Claims, 24 Drawing Sheets

(56) References Cited

U.S. PATENT DOCUMENTS

| | | | | |
|---|---|---|---|---|
| 2009/0109462 A1* | 4/2009 | Hiruma | ............... | G06Q 30/04 |
| | | | | 358/1.13 |
| 2009/0213423 A1* | 8/2009 | Kusakabe | ............ | G06F 21/608 |
| | | | | 358/1.15 |
| 2010/0110488 A1* | 5/2010 | Tsujimoto | ............. | G03G 21/02 |
| | | | | 358/1.15 |
| 2014/0355039 A1* | 12/2014 | Tsujimoto | ............. | G06F 3/1204 |
| | | | | 358/1.14 |
| 2015/0029551 A1* | 1/2015 | Okada | ............... | G06K 15/1894 |
| | | | | 358/1.15 |
| 2015/0301772 A1* | 10/2015 | Nakajima | ............ | G06F 3/1285 |
| | | | | 358/1.15 |

FOREIGN PATENT DOCUMENTS

| | | |
|---|---|---|
| CN | 100439113 C | 12/2008 |
| CN | 104025012 A | 9/2014 |
| JP | 2008236009 A | 10/2008 |
| JP | 2009-040010 A | 2/2009 |
| JP | 2009-199440 A | 9/2009 |
| WO | 20130945254 A1 | 6/2013 |

* cited by examiner

PRINTER DRIVER

301 — PRINTER NAME: MFP100 ▼

302
- COLOR MODE: FULL-COLOR ▼
- SHEET SIZE: A3 ▼
- NUMBER OF COPIES: 100
- FINISHING: STAPLING (UPPER LEFT) [CUSTOM...]

303 — OUTPUT METHOD: PRINTING ▼

304 — [OK] [CANCEL]

CONFIRMATION OF PASSWORD

CONFIRM USER NAME AND PASSWORD.

- USER NAME: UserA — 311
- PASSWORD: aabbcc — 312

[OK] [CANCEL]

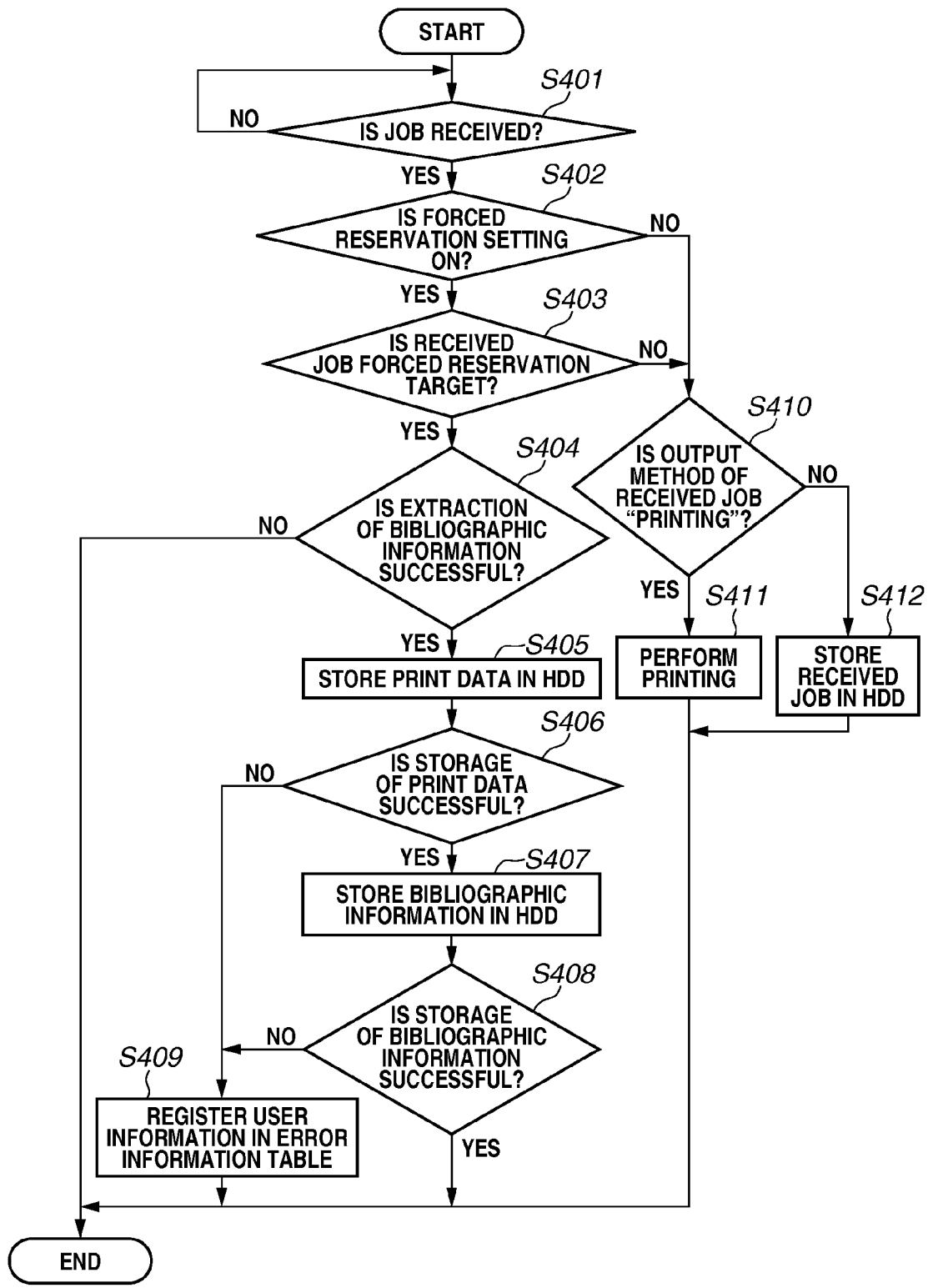

FIG.5

| USER NAME *504* | DATE AND TIME *501* | STORAGE LOCATION *502* | | JOB NAME *505* | PRINT SETTINGS *503* | | | |
|---|---|---|---|---|---|---|---|---|
| | | IP ADDRESS | PATH | | COLOR MODE | SHEET SIZE | NUMBER OF COPIES | FINISHING |
| UserA | 04/10/2012 10:34:45 | 192.168.2.11 | — | AAA.ppt | FULL-COLOR | A3 | 100 | STAPLING (UPPER LEFT) |
| | 04/20/2012 13:50:22 | 192.168.2.11 | /printdata/0691/yyy | BBB.txt | FULL-COLOR | A4 | 1 | TWO-SIDED PRINTING ON |
| | 05/28/2012 14:10:00 | 192.168.2.11 | /printdata/8125/zzz | CCC.doc | GRAY SCALE | A4 2 IN 1 | 10 | PUNCHING (LEFT) |
| | ⋮ | ⋮ | ⋮ | ⋮ | ⋮ | ⋮ | ⋮ | ⋮ |
| UserB | 05/28/2012 09:10:05 | 192.168.2.11 | /printdata/0023/sss | DDD.txt | MONOCHROME | B5 | 1 | — |
| | 06/01/2012 21:53:02 | 192.168.2.11 | — | EEE.jpg | FULL-COLOR | A4 | 1 | — |
| | ⋮ | ⋮ | ⋮ | ⋮ | ⋮ | ⋮ | ⋮ | ⋮ |
| UserC | ⋮ | ⋮ | ⋮ | ⋮ | ⋮ | ⋮ | ⋮ | ⋮ |

*500*

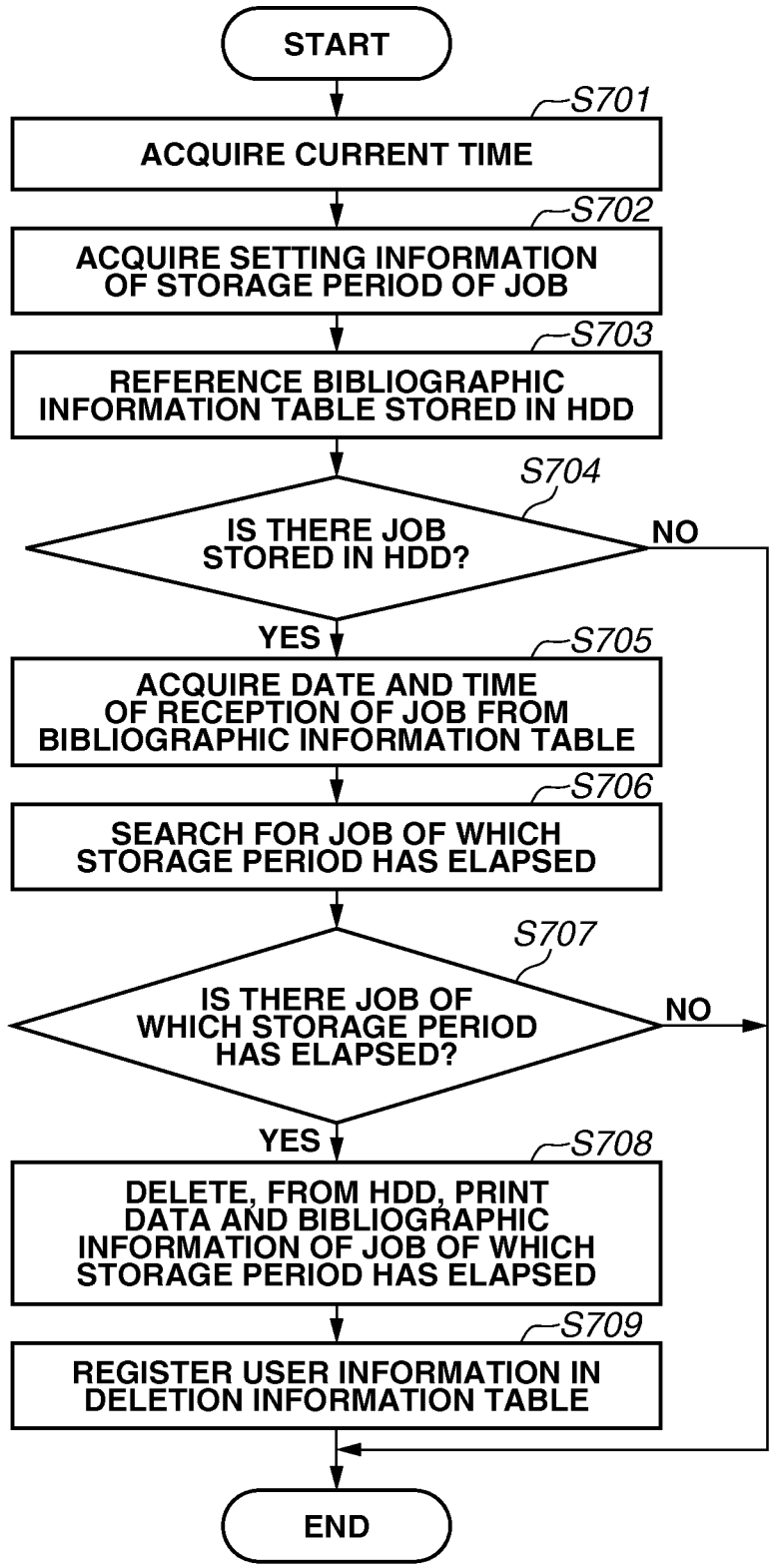

| ✓ | DATE/TIME | JOB NAME/PRINT SETTINGS | SHEETS × COPIES | USER NAME |
|---|---|---|---|---|
| ■1 ✓ | 4/20 13:50 | BBB.txt<br>FULL-COLOR, A4, TWO-SIDED PRINTING ON | 5 × 1 | UserA |
|  | 5/28 14:10 | CCC.doc<br>GRAY SCALE, A4, 2 IN 1, PUNCHING (LEFT) | 10 × 10 | UserA |

JOB LIST

*1101*

[ PRINT SETTINGS ▶ ]  [ JOB DELETION ▶ ]  [ STOP PRINTING ]  [ START PRINTING ]

JOB LIST

THERE IS DELETED JOB. ~1211

| ✓ | DATE/TIME | JOB NAME/PRINT SETTINGS | SHEETS × COPIES | USER NAME |
|---|---|---|---|---|
| 1✓ | 4/20 13:50 | BBB.txt<br>FULL-COLOR, A4, TWO-SIDED PRINTING ON | 5 × 1 | UserA |

[ PRINT SETTINGS ] [ JOB DELETION ] [ STOP PRINTING ] [ START PRINTING ]

FIG.12B

JOB LIST

THERE IS JOB OF WHICH STORAGE HAS FAILED WHEN RECEIVED. ~1221

| ✓ | DATE/TIME | JOB NAME/PRINT SETTINGS | SHEETS × COPIES | USER NAME |
|---|---|---|---|---|
| 1✓ | 4/20 13:50 | BBB.txt<br>FULL-COLOR, A4, TWO-SIDED PRINTING ON | 5 × 1 | UserA |

[ PRINT SETTINGS ] [ JOB DELETION ] [ STOP PRINTING ] [ START PRINTING ]

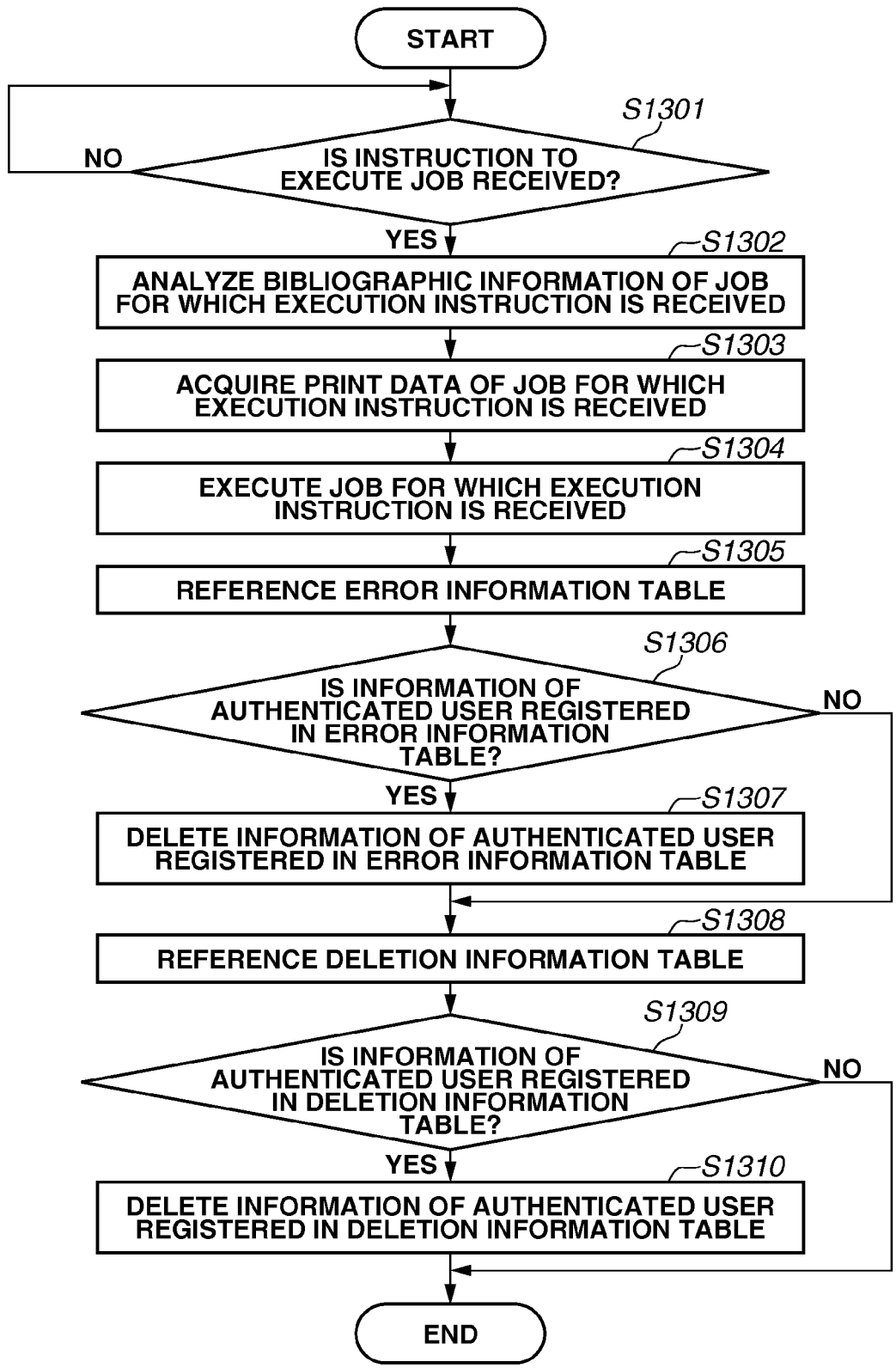

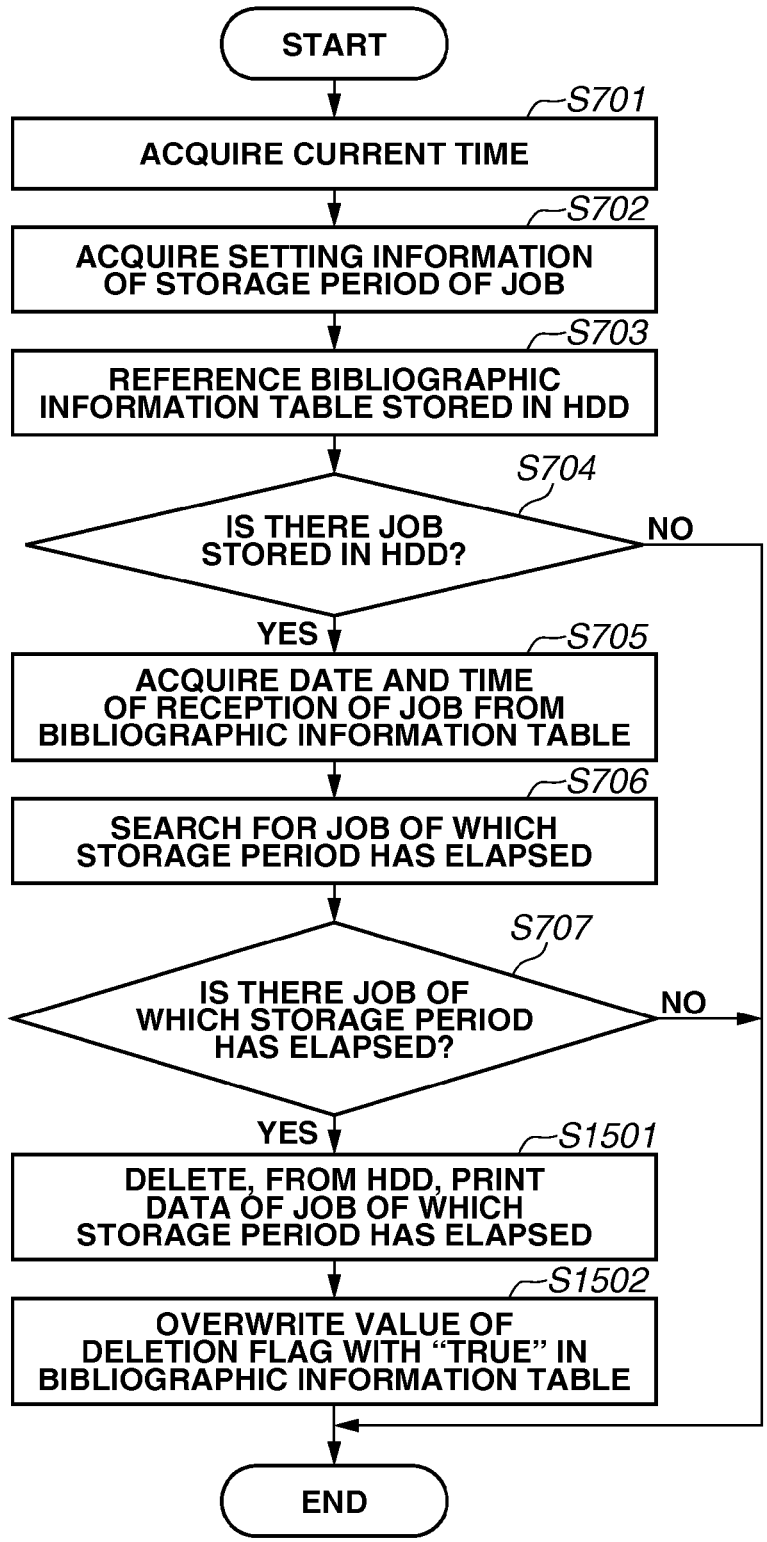

FIG.16

| DATE AND TIME (501) | STORAGE LOCATION (502) | | JOB NAME (505) | PRINT SETTINGS (503) | | | | USER NAME (1601) | STORAGE RESULT (1602) | DELETION FLAG (1603) |
|---|---|---|---|---|---|---|---|---|---|---|
| | IP ADDRESS | PATH | | COLOR MODE | SHEET SIZE | NUMBER OF COPIES | FINISHING | | | |
| 04/10/2012 10:34:45 | 192.168.2.11 | — | AAA.ppt | FULL-COLOR | A3 | 100 | STAPLING (UPPER LEFT) | UserA | NG | — |
| 04/20/2012 13:50:22 | 192.168.2.11 | /printdata/0691/yyy | BBB.txt | FULL-COLOR | A4 | 1 | TWO-SIDED PRINTING ON | UserA | OK | FALSE |
| 05/28/2012 14:10:00 | 192.168.2.11 | /printdata/8125/zzz | CCC.doc | GRAY SCALE | A4 2IN1 | 10 | PUNCHING (LEFT) | UserA | OK | TRUE |
| 05/28/2012 09:10:05 | 192.168.2.11 | /printdata/0023/sss | DDD.txt | MONOCHROME | B5 | 1 | — | UserB | OK | TRUE |
| 06/01/2012 21:53:02 | 192.168.2.11 | — | EEE.jpg | FULL-COLOR | A4 | 1 | — | UserC | NG | — |
| ... | ... | ... | ... | ... | ... | ... | ... | ... | ... | ... |

JOB LIST 1800

| DELETION | STORAGE | DATE/TIME | JOB NAME/PRINT SETTINGS | SHEETS × COPIES | USER NAME |
|---|---|---|---|---|---|
| | NG | 4/10 10:34 | AAA.ppt<br>FULL-COLOR, A3, STAPLING (UPPER LEFT) | 10 × 100 | UserA |
| | OK | 4/20 13:50 | BBB.txt<br>FULL-COLOR, A4, TWO-SIDED PRINTING ON | 5 × 1 | UserA |
| DELETED | OK | 5/28 14:10 | CCC.doc<br>GRAY SCALE, A4, 2 IN 1, PUNCHING (LEFT) | 10 × 10 | UserA |
| DELETED | OK | 5/28 09:10 | DDD.txt<br>MONOCHROME, B5 | 3 × 1 | UserB |
| | NG | 6/1 21:53 | EEE.jpg<br>FULL-COLOR, A4 | 1 × 1 | UserC |

PRINT SETTINGS ▲   JOB DELETION ▲   STOP PRINTING   START PRINTING

1802 — NG (row 1)
1801 — OK (row 2)
1803 — DELETED (row 3)

JOB HISTORY

| | | PRINTING | STORAGE | *2301* | *2302* | *2303* |

| DATE/TIME | DEPARTMENT ID | JOB NAME | USER | RESULT | DELETION |
|---|---|---|---|---|---|
| 4/10 10:34 | 1111 | AAA.ppt | UserA | NG | |
| 5/28 09:10 | 2222 | DDD.txt | UserB | OK | DELETED |
| 6/1 21:53 | 2222 | EEE.jpg | UserC | NG | |

[ PRINT SETTINGS ▸ ] [ JOB DELETION ▸ ] [ STOP PRINTING ] [ START PRINTING ]

IMAGE FORMING APPARATUS FOR SELECTIVELY STORING PRINT DATA AND DISPLAYING ALERTS TO A USER

BACKGROUND OF THE INVENTION

Field of the Invention

The present invention relates to a job processing apparatus, a job processing system, a method for controlling the job processing apparatus, and a storage medium.

Description of the Related Art

There is an image processing apparatus that allows a user to set a storage period for data (e.g., image data) held in a hard disk drive (HDD). This image processing apparatus determines whether the storage period of the data held in the HDD elapses. Then, if it is determined that the storage period elapses, the image processing apparatus deletes the data from the HDD (see Japanese Patent Application Laid-Open No. 2008-236009).

In the case of the image processing apparatus discussed in Japanese Patent Application Laid-Open No. 2008-236009, if, after the user logs out of the image processing apparatus, the storage period of the data held in the HDD elapses and the data is deleted from the HDD, the user cannot easily recognize that there is deleted data. Thus, for example, when the user logs into the image processing apparatus, the user may search for the data that the user desires to print, without realizing that this data has already been deleted from the HDD.

SUMMARY OF THE INVENTION

According to an aspect of the present invention, a job processing apparatus includes a holding unit configured to hold a job associated with a user, a first storing unit configured to store identification information for identifying a user associated with a job deleted from the holding unit, a second storing unit configured to store identification information for identifying a user associated with a job of which holding in the holding unit has failed, a first notification unit configured to notify a user, based on the identification information stored in the first storing unit, that the job is deleted, and a second notification unit configured to notify a user, based on the identification information stored in the second storing unit, that the holding of the job has failed. According to log-in of the user, to the job processing apparatus, identified by the identification information stored in the first storing unit, the first notification unit notifies the user that the job is deleted. According to log-in of the user, to the job processing apparatus, identified by the identification information stored in the second storing unit, the second notification unit notifies the user that the holding of the job has failed.

Further features of the present invention will become apparent from the following description of exemplary embodiments with reference to the attached drawings.

BRIEF DESCRIPTION OF THE DRAWINGS

FIGS. 3A and 3B illustrate configurations of screens according to the first exemplary embodiment.

FIG. 4 is a flowchart illustrating an example of control according to the first exemplary embodiment.

FIG. 5 illustrates an example of a table according to the first exemplary embodiment.

FIG. 7 is a flowchart illustrating an example of control according to the first exemplary embodiment.

FIG. 11 illustrates a configuration of a screen according to the first exemplary embodiment.

FIGS. 12A, 12B, and 12C illustrate configurations of screens according to the first exemplary embodiment.

FIG. 13 is a flowchart illustrating an example of control according to the first exemplary embodiment.

FIG. 15 is a flowchart illustrating an example of control according to the second exemplary embodiment.

FIG. 16 illustrates an example of a table according to the second exemplary embodiment.

FIG. 18 illustrates a screen according to the second exemplary embodiment.

FIG. 23 illustrates a configuration of a screen according to the third exemplary embodiment.

DESCRIPTION OF THE EMBODIMENTS

Exemplary embodiments of the present invention will be described in detail below with reference to the accompanying drawings. The following exemplary embodiments do not limit the present invention according to the appended claims, and not all the combinations of the features described in the exemplary embodiments are essential for a method for solving the problems in the present invention. Each of the exemplary embodiments of the present invention described below can be implemented solely or as a combination of a plurality of the exemplary embodiments or features thereof where necessary or where the combination of elements or features from individual exemplary embodiments in a single exemplary embodiment is beneficial.

Figure 1:
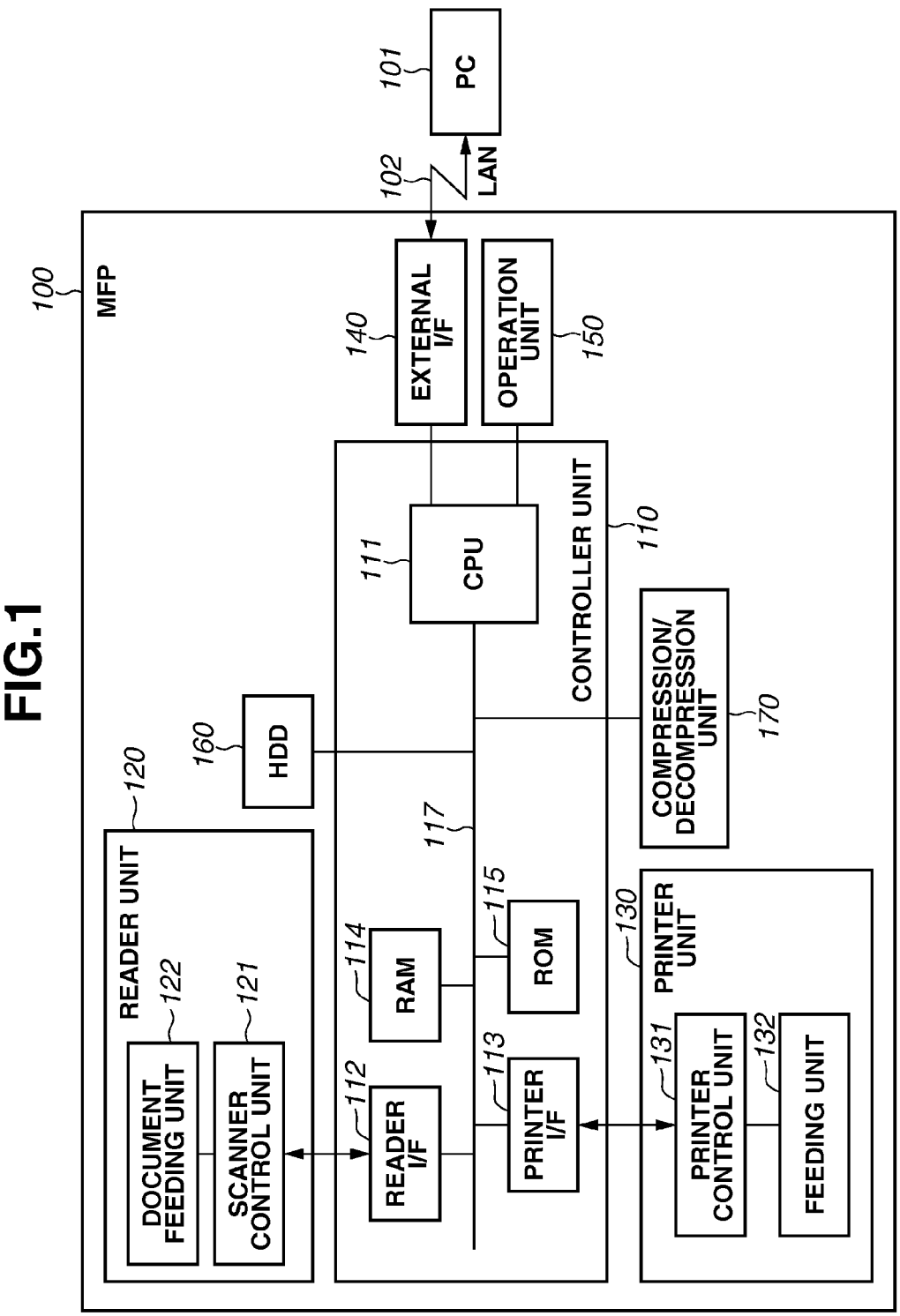
FIG. 1 is a block diagram illustrating a functional configuration of a multifunction peripheral (MFP) according to a first exemplary embodiment.

With reference to FIG. 1, a job processing system according to a first exemplary embodiment of the present invention will be described.

In the first exemplary embodiment, a central processing unit (CPU) 111 of a controller unit 110 receives a job associated with a user and holds the received job. Then, if the job held in association with identification information of the user is deleted, the CPU 111 notifies the user, who has logged into a multifunction peripheral (MFP) 100, that there is a deleted job. The details will be described below.

The job processing system according to the present exemplary embodiment includes a job processing apparatus and an external information processing apparatus.

The job processing system is, for example, a printing system. The printing system includes, for example, a printing apparatus, which is an example of the job processing apparatus, and a personal computer (PC) 101 (a computer), which is an example of the external information processing apparatus. Further, the job processing system may be, instead of the printing system, an information processing apparatus including the job processing apparatus and the PC 101.

The MFP 100, which is an example of the printing apparatus, has an image reading function for reading a document to generate image data, and a print function (copy function) for printing an image on a sheet based on the generated image data. The MFP 100 also has a print function (PC print function) for receiving a print job from the PC 101 to print text or an image on a sheet based on data for which a print instruction is received. The printing performed by the print functions may be color printing or monochrome printing.

The job processing apparatus may be, instead of the MFP 100, a scanner capable of receiving a job from the PC 101 and executing the received job. Further, the job processing apparatus may not necessarily have the image reading function and the print functions.

In the present exemplary embodiment, a description will be given below of a case where the MFP 100 is connected to the PC 101 via a local area network (LAN) 102 such as a local area network, and the MFP 100 communicates with the PC 101.

In the present exemplary embodiment, the PC 101 inputs a print job to the MFP 100 via a network such as the LAN 102. Then, the MFP 100 processes the print job that is input from the PC 101 via the network such as the LAN 102.

The MFP 100 and the PC 101 may be connected together via a wide area network (WAN) such as the Internet. Alternatively, the MFP 100 and the PC 101 may be connected together via a Universal Serial Bus (USB) cable. Further, the MFP 100 and the PC 101 may be configured to be able to communicate with each other using wireless communication such as Wireless Fidelity (Wi-Fi) or Bluetooth (registered trademark).

The PC 101 generates image data using application software and transmits the generated image data to the MFP 100.

The MFP 100 includes the controller unit (control unit) 110, a reader unit 120, a printer unit 130, an external interface (I/F) 140, an operation unit 150, an HDD 160, and a compression/decompression unit 170, all of which will be described below. These components are placed on a system bus 117 and electrically connected together to transmit/receive a control command and data to/from one another. Further, the external I/F 140, which is an example of a communication unit, is an interface for transmitting/receiving image data to/from the PC 101.

The reader unit 120 includes a scanner control unit 121, which controls communication with the controller unit 110, and a document feeding unit 122, which feeds a document.

The controller unit 110 instructs, via the scanner control unit 121, the reader unit 120 to read a document. Then, the reader unit 120 optically reads an image of the document and converts the image into image data as an electric signal. In the present exemplary embodiment, a description will be given below of a case where the controller unit 110 instructs, via the scanner control unit 121, the reader unit 120 to read a document. The present exemplary embodiment, however, is not limited to such a case. In the case of an MFP that does not include the scanner control unit 121 as a component in the reader unit 120, the CPU 111 of the controller unit 110 may directly instruct the reader unit 120 to read a document.

On the other hand, the printer unit 130 includes a printer control unit 131, which controls communication with the controller unit 110. The printer unit 130 also includes a feeding unit (sheet holding unit) 132 having a feeding cassette and a manual feed tray for holding a sheet for use in printing. In the present exemplary embodiment, a description will be given taking as an example of the feeding unit 132 a plurality of feeding cassettes and a manual feed tray that are included in the MFP 100. Alternatively, the feeding unit 132 may be a feeding deck included in a feeding device connected to the MFP 100.

Further, the printer unit 130 performs processing for printing a job that is a print target and is stored in the HDD 160. The controller unit 110 instructs, via the printer control unit 131, the printer unit 130 to print image data. Then, the printer unit 130 transfers and fixes a toner image, which is formed based on the image data, onto a sheet fed from the sheet holding unit, thereby forming (printing) an image on the sheet using toner. The transfer and the fixing will be described below. In the present exemplary embodiment, a description will be given below of a case where the controller unit 110 instructs, via the printer control unit 131, the printer unit 130 to print image data. The present exemplary embodiment, however, is not limited to such a case. In the case of an MFP that does not include the printer control unit 131 as a component in the printer unit 130, the CPU 111 of the controller unit 110 may directly instruct the printer unit 130 to print image data.

The HDD 160 holds system software and image data compressed by the compression/decompression unit 170 (described below). Further, the HDD 160 can store print data of a print job to be processed and bibliographic information extracted by analyzing the attributes of the print job. The "bibliographic information" refers to, for example, the date and time when the job has been received, the storage location (the Internet Protocol (IP) address and the path) of the received job, the job name, and the print setting information (the color mode, the sheet size, the number of copies, and the finishing) of the received job. As described in the present exemplary embodiment, if print data of a received job is stored in the HDD 160 of a single MFP 100, information of the IP address may not be held as the storage location of the received job in the bibliographic information.

Further, the HDD 160 can hold authentication information such as a user name and a password for logging into the MFP 100. Further, the HDD 160 can store a bibliographic information table 500, which will be described below with reference to FIG. 5.

In the present exemplary embodiment, a description will be given using the HDD 160 as an example of a large-capacity and non-volatile storage device. Alternatively, a non-volatile memory such as a solid-state drive (SSD) may be used as long as the non-volatile memory is a large-capacity and non-volatile storage device.

The controller unit 110 has a plurality of functions. For example, the controller unit 110 stores, in the HDD 160, image data of a document read by the reader unit 120. Then, the controller unit 110 can read the image data from the HDD 160 and cause the printer unit 130 to execute a copy job for printing an image on a sheet based on the read image data. Further, the controller unit 110 can perform a scanner function for converting image data of a document read by the reader unit 120 into code data and transmitting the code data to the PC 101 via the external I/F 140, which is an example of a communication unit. Further, the controller unit 110 stores in the HDD 160 a print job received from the PC 101 via the external I/F 140. Then, the controller unit 110 performs a print function (PC print function) for converting code data read from the HDD 160 into image data and causing the printer unit 130 to print an image on a sheet based on the read image data.

Further, the controller unit 110 includes the CPU 111, a read-only memory (ROM) 115, a random-access memory (RAM) 114, a reader I/F 112, and a printer I/F 113.

The CPU 111 controls the processing and the operations of the reader unit 120, the printer unit 130, and various units (e.g., the feeding unit 132) that are included in the MFP 100.

The ROM 115 is a read-only memory and stores programs for a boot sequence and font information in advance.

On the other hand, the RAM 114 is a readable and writable memory and stores image data transmitted from the reader unit 120 or the external I/F 140, various programs, and setting information.

The ROM 115 or the HDD 160 stores various control programs to be executed by the CPU 111 and required to perform various types of processing of flowcharts to be described below. Then, the CPU 111 reads a program stored in the ROM 115 or the HDD 160 and loads the program into the RAM 114, thereby performing various operations according to the present exemplary embodiment.

Further, the ROM 115 or the HDD 160 stores, for example, a display control program for displaying various user interface screens (hereinafter referred to as "UI screens") on a display unit of the operation unit 150 (described below). Further, the ROM 115 or the HDD 160 stores, as a program for controlling the operation unit 150, a UI function program for identifying a content input by a user via the operation unit 150 to perform an appropriate screen transition or issue a processing request instruction to the controller unit 110.

Further, the ROM 115 or the HDD 160 stores, for example, a page description language (PDL) function program for causing the CPU 111 to interpret PDL data received from the PC 101 via the external I/F 140 and convert the PDL data into raster image data (bitmap image data), and causing the controller unit 110 to perform a print function.

Further, the HDD 160 stores the bibliographic information table 500, which will be described below with reference to FIG. 5, an error information table 610, which will be described below with reference to FIG. 6A, and a deletion information table 620, which will be described below with reference to FIG. 6B. A description will be given below of a case where the bibliographic information table 500, the error information table 610, and the deletion information table 620 are stored in the HDD 160. Alternatively, these tables may be stored in a volatile RAM.

The controller unit 110 holds in the HDD 160 a job that is a processing target and has been input via various input units such as the reader unit 120 and the external I/F 140. Then, the controller unit 110 reads the job from the HDD 160 and outputs the job to the printer unit 130, thereby performing printing. Further, the controller unit 110 also controls the job read from the HDD 160, so that the job can be transmitted to the PC 101 via the external I/F 140.

The compression/decompression unit 170 includes an image processing block for performing processing for compressing and decompressing image data stored in the RAM 114 or the HDD 160, using various compression methods such as Joint Bi-level Image Experts Group (JBIG) and Joint Photographic Experts Group (JPEG), and for holding the image data in the RAM 114 again. The image data compressed by the compression/decompression unit 170 can be transmitted to the PC 101 via the external I/F 140.

The controller unit 110 can receive image data from the PC 101 via the external I/F 140. When the image data received via the external I/F 140 is to be held in the HDD 160, the image data is compressed by the compression/decompression unit 170. On the other hand, when an image is to be printed on a sheet based on the image data held in the HDD 160, the image data is decompressed by the compression/decompression unit 170. Further, the controller unit 110 performs various types of output processing for a job that is a processing target and is held in the HDD 160. A description has been given here of an example where a job is held in the HDD 160. Alternatively, a job may be held in a volatile RAM.

The reader I/F 112 is an interface for connecting to the reader unit 120, which is an image input apparatus. The printer I/F 113 is an interface for connecting to the printer unit 130, which is an image output apparatus. The controller unit 110 performs the synchronous/asynchronous conversion and control of image data via the reader I/F 112 or the printer I/F 113.

Further, the MFP 100 includes the operation unit 150, which includes a display unit (not illustrated) and corresponds to an example of a user interface unit. The operation unit 150 of the MFP 100 includes the display unit (not illustrated) and hardware keys (not illustrated). The display unit includes a liquid crystal display (LCD or liquid crystal display unit), and a touch panel sheet having a transparent electrode attached to the LCD (or a capacitive touch panel sheet). On the LCD, an operation screen and the state of the MFP 100 are displayed. The operation unit 150 has the function of receiving various settings from the user, and the function of providing information to the user, via the operation screen or the hardware keys.

Figure 2:
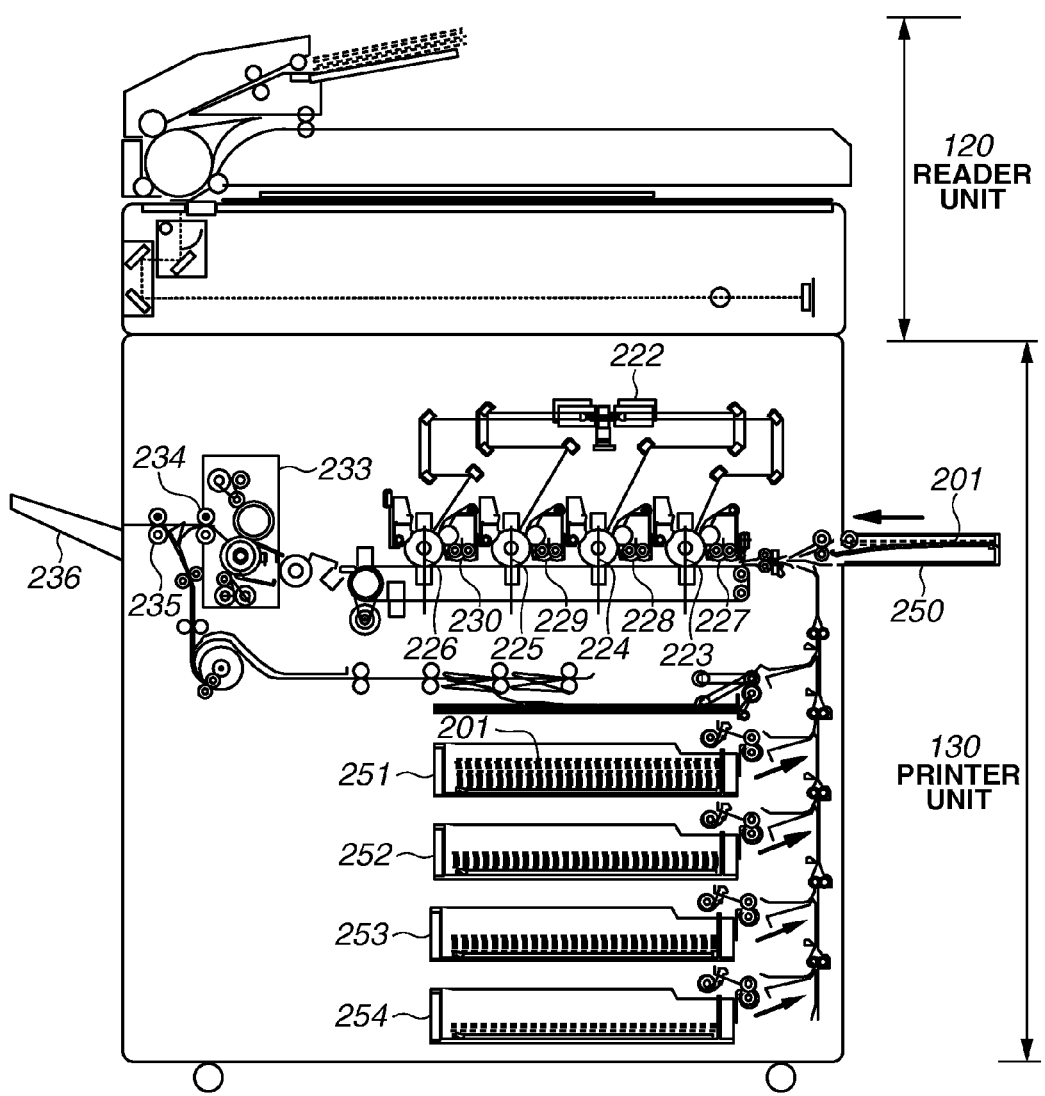
FIG. 2 is a cross-sectional view illustrating the functional configuration of the MFP according to the first exemplary embodiment.

FIG. 2 illustrates a cross-sectional view of the reader unit 120 and the printer unit 130, which are illustrated in FIG. 1.

A description will be given below of the operation (image forming operation) of outputting an image to a sheet 201 based on image data transferred to the printer unit 130.

The image data transferred to the printer unit 130 is converted into laser light according to the image data by a laser unit 222. Then, photosensitive drums 223 to 226 are irradiated with the laser light, thereby forming electrostatic latent images according to the image data on the photosensitive drums 223 to 226. To the latent image portions on the photosensitive drums 223 to 226, toner is attached by developing units 227 to 230, respectively. A color printer includes four photosensitive drums and four developing units for cyan, yellow, magenta, and black.

Further, the printer unit 130 includes, as sheet holding units provided in the feeding unit 132, drawer-type feeding cassettes 251 to 254 and a manual feed tray 250. The feeding cassettes 251 to 254 can hold a plurality of the sheets 201 (e.g., 600 sheets). On the other hand, the manual feed tray 250 can hold a plurality of the sheets 201 (e.g., 100 sheets). The printer unit 130 may include at least one of the feeding cassettes 251 to 254 and the manual feed tray 250. The following description will be given on the assumption that the MFP 100 according to the present exemplary embodiment includes four feeding cassettes 251 to 254 and one manual feed tray 250.

The printer unit 130 feeds the sheet 201 from any one of the feeding cassettes 251 to 254 and the manual feed tray 250. Then, the printer unit 130 transfers the toner attached to the photosensitive drums 223 to 226 onto the sheet 201, and then conveys the resulting sheet 201 to a fixing device 233 to fix the toner to the sheet 201 by heat and pressure. As the setting values of a sheet holding unit for feeding the sheet 201, the temperature of the fixing device 233 and the speed of conveying the sheet 201 are controlled based on attribute information, such as the basis weight of the sheet 201, stored in the HDD 160. The sheet 201 having passed through the fixing device 233 is discharged to a discharge tray 236 by conveyance rollers 234 and 235.

In the present exemplary embodiment, the case has been described where a color printer including four photosensitive drums and four developing units is used. Alternatively, the present exemplary embodiment can also be similarly applied to a monochrome printer including one photosensitive drum and one developing unit. Further, in the present exemplary embodiment, a description has been given of a method for printing an image on a sheet through an electrophotographic process. Alternatively, for example, an inkjet method or another method (e.g., a thermal transfer method) may be used as long as the method can print an image.

In the present exemplary embodiment, the PC 101 inputs a print job to the MFP 100, using a print function of an arbitrary application or a printer driver.

For example, on a printer driver screen 300 illustrated in FIG. 3A, which is displayed on an operation unit (not illustrated) of the PC 101, the user can specify, as a printer name 301, the MFP 100 to be used to execute a print job. Further, the user can specify, for example, the color mode, the sheet size, the number of copies, and the finishing as print settings 302. Further, the user can specify, for example, "printing", "secure printing", "encrypted secure printing", "storage", and "holding" as an output method 303 of the print job.

If, for example, "printing" is specified as the output method 303, print data such as PDL data is generated by reflecting the print settings 302 that are specified using the function provided by the printer driver to specify a print format. Then, the print job associated with user information (e.g., a log-in name for the PC 101, and identification information such as an authenticated user identification (ID)) is transmitted to the MFP 100 specified by the user. The user information associated with the print job is, for example, a log-in name for the PC 101 and an authenticated user ID. The log-in name for the PC 101 is acquired when the user logs into the PC 101 on a log-in screen (not illustrated) displayed on the operation unit (not illustrated) of the PC 101.

Alternatively, if a confirmation screen 310 illustrated in FIG. 3B is displayed on the operation unit (not illustrated) of the PC 101, in response to the user pressing an OK button 304 on the printer driver screen 300, a user name 311, which has been input by the user on the confirmation screen 310, may be associated with the print job. Then, the MFP 100 receives the print job associated with the user information and performs printing.

On the other hand, if, for example, "storage" or "holding" is specified as the output method 303, print data such as PDL data is generated by reflecting the print settings 302. Then, the print job associated with user information is transmitted to the MFP 100 specified by the user. Then, the MFP 100 receives the print job associated with the user information and stores the print job in the HDD 160.

On the other hand, if, for example, "secure printing" is specified as the output method 303, the user is requested, for example, via the confirmation screen 310 illustrated in FIG. 3B, to enter the user name 311 and a password 312. Then, print data such as PDL data is generated by reflecting the print settings 302. Then, the print job associated with user information including the password 312 is transmitted to the MFP 100 specified by the user. The MFP 100 receives the print job associated with the user information including the password 312 and stores the print job in the HDD 160.

On the other hand, if, for example, "encrypted secure printing" is specified as the output method 303, the user is requested, for example, via the confirmation screen 310 illustrated in FIG. 3B, to enter the user name 311 and the password 312. Then, print data such as PDL data is generated by reflecting the print settings 302. Then, the print data is encrypted, and the print job associated with user information including the password 312 is transmitted to the MFP 100 specified by the user. The MFP 100 receives the print job associated with the user information including the password 312 and stores the print job in the HDD 160.

In the first exemplary embodiment, the CPU 111 of the controller unit 110 receives a job associated with a user and holds the received job. Then, if the job held in association with identification information of the user is deleted, the CPU 111 notifies the user, who has logged into the MFP 100, that there is a deleted job.

The details will be described below.

First, with reference to a flowchart illustrated in FIG. 4, a description will be given of a series of processes in which the MFP 100 according to the first exemplary embodiment stores, in the HDD 160, bibliographic information and print data of a received job. This processing is performed by the CPU 111 of the controller unit 110 executing the PDL function program read from the ROM 115 or the HDD 160 and loaded into the RAM 114.

In step S401, the CPU 111 determines whether a job has been received via the external I/F 140. The job to be received in step S401 is, for example, a job that has been input from the PC 101 to the MFP 100 via the above-described printer driver screen 300 illustrated in FIG. 3A. As a result of the determination in step S401, if the CPU 111 determines that a job has been received (YES in step S401), the processing proceeds to step S402. On the other hand, if the determination is NO (NO in step S401), the process of step S401 is repeated until a job is received.

In step S402, the CPU 111 determines whether a forced reservation setting is on in the MFP 100 having received the job in step S401. The user (administrator) can optionally set, for each MFP 100, whether the forced reservation setting is on or off. The "forced reservation" refers to the operation of, if a print job associated with user information has been received, forcibly storing the received print job in the HDD 160. That is, if the forced reservation setting is on, even when, for example, "printing" is specified as the output method 303 of the printer driver, a job that has been input to the MFP 100 is forcibly stored in the HDD 160.

As a result of the determination in step S402, if the CPU 111 determines that the forced reservation setting is on (YES in step S402), the processing proceeds to step S403. On the other hand, if the determination is NO (NO in step S402), the processing proceeds to step S410.

In step S403, the CPU 111 analyzes the settings of the job received in step S401 and determines whether the job is a forced reservation target (i.e., a target to be forcibly stored in the HDD 160). For example, if user information of the user having input the job is not determined (not set), even when the forced reservation setting is on in the MFP 100 having received the job, the job may be removed from forced reservation targets. Further, for example, if user information of the user having input the job indicates a particular user, even when the forced reservation setting is on in the MFP 100 having received the job, the job may be removed from forced reservation targets. Further, for example, if the IP address of the input source of the job is a particular IP address, even when the forced reservation setting is on in the MFP 100 having received the job, the job may be removed from forced reservation targets. The user (administrator) may be able to optionally set various conditions for setting a job as a forced reservation target.

As a result of the determination in step S403, if the CPU 111 determines that the job is a forced reservation target (YES in step S403), the processing proceeds to step S404. On the other hand, if the determination is NO (NO in step S403), the processing proceeds to step S410.

In step S404, the CPU 111 analyzes the attributes of the received job and determines whether bibliographic information has been successfully extracted.

The "bibliographic information" refers to, for example, a date and time 501 when the job has been received, a storage location 502 (the IP address and the path) of the received job, a job name 505, and print settings 503 (the color mode, the sheet size, the number of copies, and the finishing) of the received job (see FIG. 5).

There is a case where a plurality of MFPs 100 is connected together so as to be able to communicate with one another via a network such as the LAN 102. In this case, the MFP 100 for storing print data of a received job (referred to as the "storage apparatus"), the MFP 100 for registering (storing) bibliographic information (referred to as the "bibliography server apparatus"), and the MFP 100 for executing the job (referred to as the "output apparatus") may be different from one another. Thus, in the bibliographic information, the storage location (the IP address and the path) of the received job is managed.

As a result of the determination in step S404, if the CPU 111 determines that the bibliographic information has successfully extracted (YES in step S404), the processing proceeds to step S405. On the other hand, if the determination is NO (NO in step S404), the series of processes regarding FIG. 4 ends. A case where the extraction of bibliographic information has failed is, for example, a case where the attributes of the job cannot be analyzed because the job, in which user information is not set, is input. If the determination is NO (NO in step S404), the series of processes regarding FIG. 4 may end after the CPU 111 notifies the user that the extraction of bibliographic information has failed.

In step S405, the CPU 111 stores, in the HDD 160, print data extracted from the job received in step S401, and the processing proceeds to step S406. The print data is, for example, PDL data generated by reflecting the print settings 302 that are specified using the function provided by the printer driver to specify a print format.

In step S406, the CPU 111 determines whether the print data has been successfully stored in the HDD 160. As a result of the determination in step S406, if the CPU 111 determines that the print data has been successfully stored (YES in step S406), the processing proceeds to step S407. On the other hand, if the determination is NO (NO in step S406), the processing proceeds to step S409. A case where the storage of the print data has failed is, for example, a case where the HDD 160 does not have sufficient free space to store the print data. Alternatively, it may be, for example, a case where the file size of the print data to be stored in the HDD 160 reaches the maximum file size of print data that can be stored in the HDD 160. Yet alternatively, it may be, for example, a case where the number of jobs to be stored in the HDD 160 reaches the maximum number of jobs per user that can be stored in the HDD 160.

In step S407, the CPU 111 stores in the HDD 160 the bibliographic information extracted from the job received in step S401, and the processing proceeds to step S408.

In step S408, the CPU 111 determines whether the bibliographic information has been successfully stored in the HDD 160. As illustrated in the bibliographic information table 500 in FIG. 5, the bibliographic information stored in the HDD 160 is managed for each user having input a job, based on a user name 504. In the example of the bibliographic information table 500 in FIG. 5, the bibliographic information of a user A, the bibliographic information of a user B, and the bibliographic information of a user C are managed. For example, the bibliographic information table 500 indicates that the job (with the job name "AAA.ppt") that is input to the MFP 100 by the user A has been received at "10:34:45 on Apr. 10, 2012". Further, the bibliographic information table 500 indicates that the storage location of the job has the IP address "192.168.2.11". Further, the bibliographic information table 500 indicates that the print settings of the job are A3, full-color, finishing by stapling (on the upper left), and the printing of 100 copies.

As a result of the determination in step S408, if the CPU 111 determines that the bibliographic information has been successfully stored (YES in step S408), it is considered that the received job has been successfully stored in the HDD 160. Then, the series of processes regarding FIG. 4 ends. On the other hand, if the determination is NO (NO in step S408), the processing proceeds to step S409. A case where the storage of the bibliographic information has failed is, for example, a case where the HDD 160 does not have sufficient free space to store the bibliographic information.

Figure 6A:
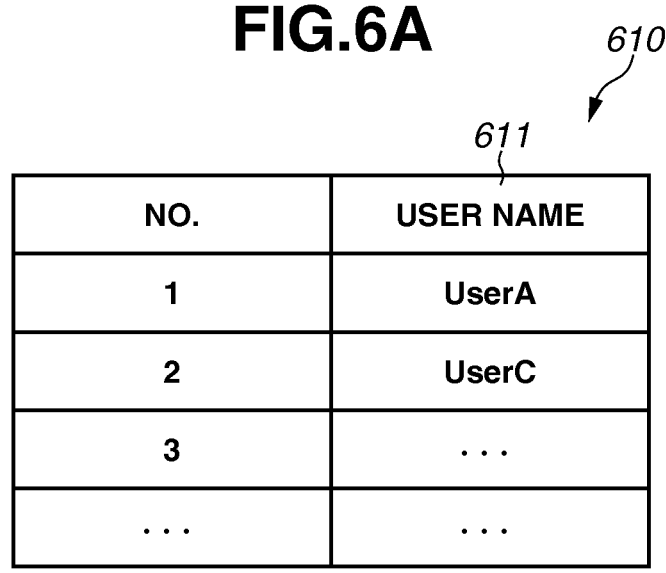
FIGS. 6A and 6B illustrate examples of tables according to the first exemplary embodiment.

In step S409, the CPU 111 registers, in the error information table 610 illustrated in FIG. 6A, which is stored in the HDD 160, the user information associated with the job received in step S401. In the error information table 610, information (a user name 611) of a user having input a job that has failed to be stored in the HDD 160 is managed. The example of the error information table 610 illustrated in FIG. 6A indicates that the storage of a job input by the user A has failed, and the storage of a job input by the user C has failed. After the process of step S409, the series of processes regarding FIG. 4 ends.

In step S410, the CPU 111 determines whether the output method of the job received in step S401 is "printing". The output method of the job is determined based on the output method 303 specified using the printer driver. As a result of the determination in step S410, if the CPU 111 determines that the output method is "printing" (YES in step S410), the processing proceeds to step S411. On the other hand, if the determination is NO (NO in step S410), the processing proceeds to step S412. A case where the determination is NO in step S410 is, for example, a case where as the output method of the job received in step S401, "secure printing", "encrypted secure printing", "storage", or "holding" is specified.

In step S411, the CPU 111 issues a request to execute the job received in step S401 and causes the printing unit 130 to perform printing based on the print settings 302 (e.g., the color mode, the sheet size, the number of copies, and the finishing) specified using the printer driver. When the printing is to be performed, the printer unit 130 controls, as the setting values of a sheet holding unit, the temperature of the fixing device 233 and the speed of conveying the sheet 201, based on attribute information, such as the basis weight of the sheet 201, stored in the HDD 160. After the process of step S411, the series of processes regarding FIG. 4 ends.

In step S412, the CPU 111 issues a request to execute the job received in step S401 and stores the job in the HDD 160. After the process of step S412, the series of processes regarding FIG. 4 ends.

This is the details of the series of processes in which the MFP 100 according to the first exemplary embodiment stores the print data and bibliographic information of a received job in the HDD 160.

The case has been described where, if the forced reservation setting is on in the MFP 100 having received a job, the received job is forcibly stored in the HDD 160. The present exemplary embodiment, however, is not limited to this. For example, the present exemplary embodiment is also applicable to a case where a job can be input to the MFP 100 by specifying "forced reservation" as the output method 303 of the printer driver. In this case, even if the forced reservation setting is off in the MFP 100 having received a job, the received job may be forcibly stored in the HDD 160.

Next, with reference to a flowchart illustrated in FIG. 7, a description will be given of a series of processes in which the MFP 100 according to the first exemplary embodiment deletes (erases) from the HDD 160 the print data of a job of which the storage period has elapsed. This processing is performed by the CPU 111 of the controller unit 110 executing a control program read from the ROM 115 or the HDD 160 and loaded into the RAM 114.

In step S701, the CPU 111 acquires the current time, and the processing proceeds to step S702.

In step S702, the CPU 111 acquires setting information of the storage period of a job stored in the HDD 160.

Figure 8:
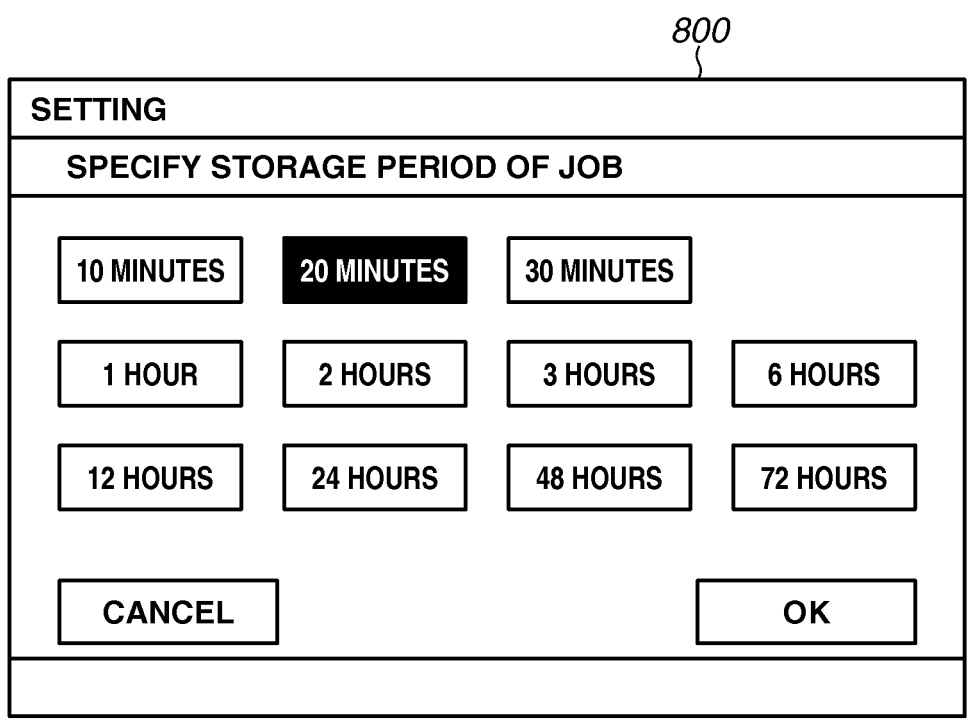
FIG. 8 illustrates a configuration of a screen according to the first exemplary embodiment.

The setting information of the storage period can be optionally set as the storage period of a job by the user, using a setting screen 800 illustrated in FIG. 8, which is displayed on the operation unit 150. When the storage period of a job is to be set, the storage period of each job stored in the HDD 160 may be able to be set, or the storage period of jobs stored in the HDD 160 may be able to be collectively set in advance. Further, the storage period of a job may be set before the job is stored in the HDD 160, or may be set after the job is stored in the HDD 160.

The storage period of a job that can be specified by the user on the setting screen 800 is, for example, any one of 10 minutes, 20 minutes, 30 minutes, 1 hour, 2 hours, 3 hours, 6 hours, 12 hours, 24 hours, 48 hours, and 72 hours. Further, the default setting of the storage period of a job is, for example, 1 hour. The storage period of a job may be able to be set in minutes, for example. Further, the setting screen 800 may be displayed not only on the operation unit 150 included in the MFP 100 but also on the operation unit (not illustrated) included in the PC 101. That is, the storage period of a job may be able to be set via the PC 101.

In step S703, the CPU 111 references the bibliographic information table 500 illustrated in FIG. 5, which is stored in the HDD 160, and the processing proceeds to step S704.

In step S704, based on the result of the reference in step S703, the CPU 111 determines whether there is a job stored in the HDD 160. As a result of the determination in step S704, if the CPU 111 determines that there is a job stored in the HDD 160 (YES in step S704), the processing proceeds to step S705. On the other hand, if the determination is NO (NO in step S704), the series of processes regarding FIG. 7 ends.

In step S705, the CPU 111 acquires, from the bibliographic information table 500 stored in the HDD 160, the date and time 501 when the job has been received, and the processing proceeds to step S706.

In step S706, based on the current time acquired in step S701, the setting information of the storage period of the job acquired in step S702, and the date and time of reception of the job acquired in step S705, the CPU 111 searches for a job of which the storage period has elapsed, among the jobs stored in the HDD 160.

Then, in step S707, as a result of the search in step S706, the CPU 111 determines whether there is a job of which the storage period has elapsed. If the CPU 111 determines that there is a job of which the storage period has elapsed (YES in step S707), the processing proceeds to step S708. On the other hand, if the determination is NO (NO in step S707), the series of processes regarding FIG. 7 ends.

In step S708, the CPU 111 deletes from the HDD 160 the print data and the bibliographic information of the job of which the storage period has elapsed according to the determination in step S707, and the processing proceeds to step S709.

Figure 6B:
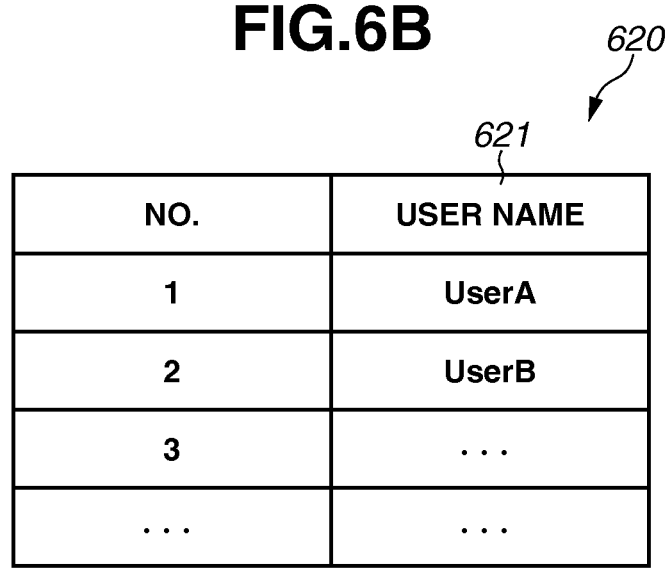

In step S709, the CPU 111 registers, in the deletion information table 620 illustrated in FIG. 6B, which is stored in the HDD 160, the user information associated with the job deleted in step S708. In the deletion information table 620, information (a user name 621) of a user having input a job, which is stored in the HDD 160 and then deleted due to the lapse of the storage period, is managed. The example of the deletion information table 620 illustrated in FIG. 6B indicates that a job input by the user A has been deleted, and a job input by the user B has been deleted. After the process of step S709, the series of processes regarding FIG. 7 ends.

This is the details of the series of processes in which the MFP 100 according to the first exemplary embodiment deletes (erases) from the HDD 160 the print data of a job of which the storage period has elapsed.

Figure 9:
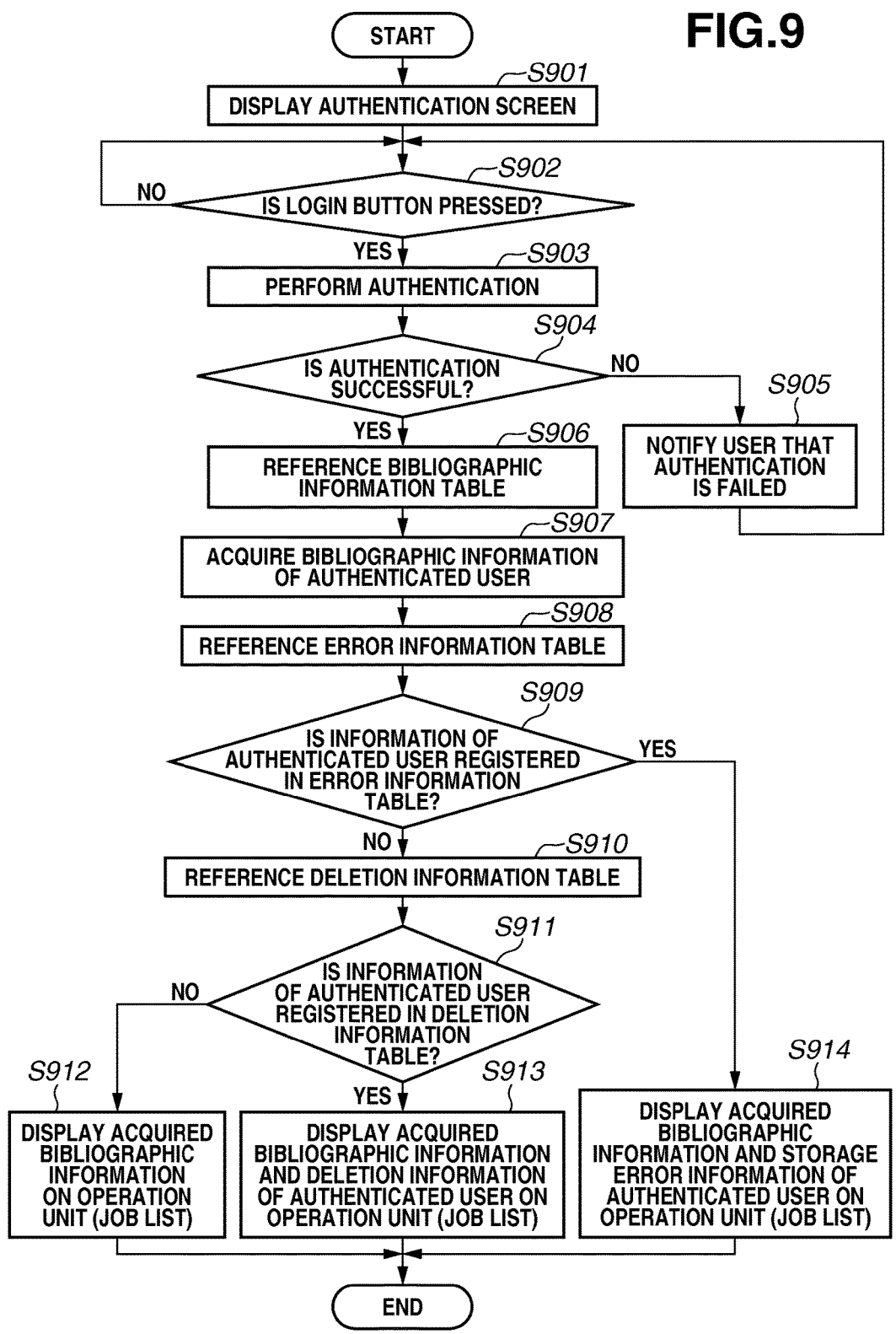
FIG. 9 is a flowchart illustrating an example of control according to the first exemplary embodiment.

Next, with reference to a flowchart illustrated in FIG. 9, a description will be given of a series of processes in which the MFP 100 according to the first exemplary embodiment displays a job list of an authenticated user. This processing is performed by the CPU 111 of the controller unit 110 executing the UI function program read from the ROM 115 or the HDD 160 and loaded into the RAM 114. The job list displays, as illustrated in a job list screen 1100 in FIG. 11, the bibliographic information of jobs stored in the HDD 160 in the form of a list on the operation unit 150. The user can select a desired job on the job list screen 1100 and issues an instruction to execute the selected job.

Figure 10:
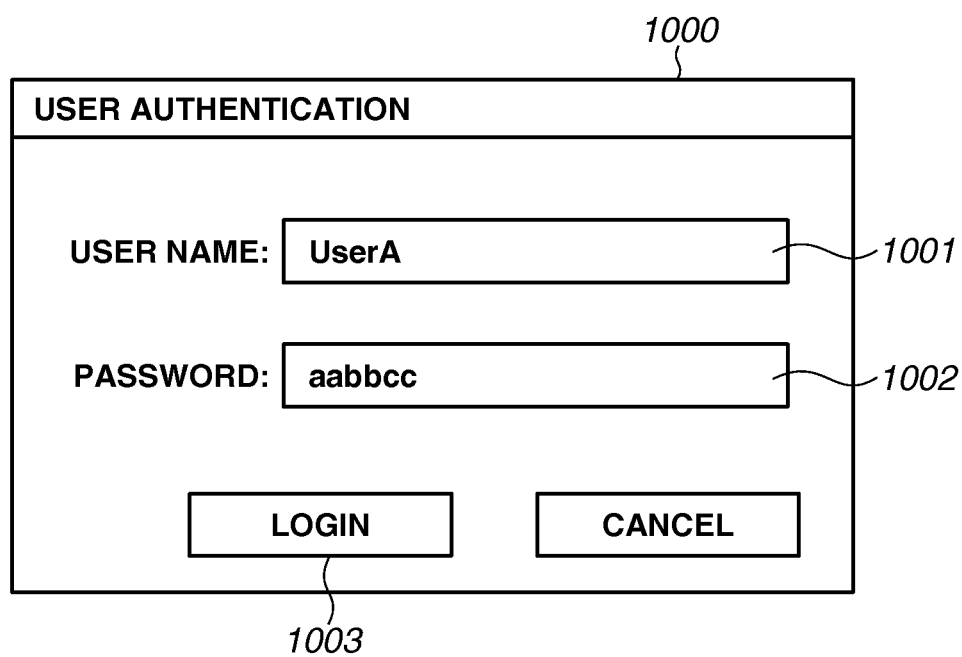
FIG. 10 illustrates a configuration of a screen according to the first exemplary embodiment.

In step S901, the CPU 111 displays on the operation unit 150 an authentication screen 1000, as illustrated in FIG. 10, for logging into the MFP 100, and the processing proceeds to step S902.

In step S902, the CPU 111 determines whether a user has input user information (e.g., a user name 1001 and a password 1002) on the authentication screen 1000 and then pressed a log-in button 1003 on the authentication screen 1000. As a result of the determination in step S902, if the CPU 111 determines that the log-in button 1003 is pressed (YES in step S902), the processing proceeds to step S903. On the other hand, if the determination is NO (NO in step S902), the process of step S902 is repeated until the CPU 111 determines that the log-in button 1003 is pressed.

In step S903, the CPU 111 checks the user information input by the user on the authentication screen 1000 against authentication information such as a user name and a password stored in the HDD 160, thereby performing authentication. Then, the processing proceeds to step S904.

In step S904, as a result of the authentication performed in step S903, the CPU 111 determines whether the authentication has succeeded. If the CPU 111 determines that the authentication has succeeded (YES in step S904), the processing proceeds to step S906. If the authentication has succeeded, the user logs into the MFP 100. On the other hand, if the determination is NO (NO in step S904), the processing proceeds to step S905.

In step S905, the CPU 111 displays on the operation unit 150 a message (not illustrated) indicating that the authentication has failed, thereby notifying the user of the failure. Then, the processing returns to step S902.

In step S906, the CPU 111 references the bibliographic information table 500 illustrated in FIG. 5, which is stored in the HDD 160, and the processing proceeds to step S907. When referencing the bibliographic information table 500, the CPU 111 searches for the user name 1001 of the authenticated user, using as a key the user name 504 registered in the bibliographic information table 500. Then, as a result of the search, the CPU 111 performs matching between the user name 504 and the user name 1001 and references only the bibliographic information of the authenticated user.

In step S907, according to the result of the reference in step S906, the CPU 111 acquires the bibliographic information of the authenticated user, and the processing proceeds to step S908. In the example of the bibliographic information table 500 illustrated in FIG. 5, if the user name 1001 of the authenticated user is "user A", only the bibliographic information in which the user name 504 is "user A" is acquired from the bibliographic information registered in the bibliographic information table 500.

In step S908, the CPU 111 references the error information table 610 illustrated in FIG. 6A, which is stored in the HDD 160, and the processing proceeds to step S909. When referencing the error information table 610, the CPU 111 searches for the user name 1001 of the authenticated user, using as a key the user name 611 registered in the error information table 610.

In step S909, based on the result of the reference in step S908, the CPU 111 determines whether information (the user name) of the authenticated user is registered in the error information table 610 (this is called a "storage determination"). As a result of the determination in step S909, if the CPU 111 determines that the information of the authenticated user is registered (YES in step S909), the processing proceeds to step S914. On the other hand, if the determination is NO (NO in step S909), the processing proceeds to step S910.

In step S910, the CPU 111 references the deletion information table 620, which is stored in the HDD 160, and the processing proceeds to step S911. When referencing the deletion information table 620, the CPU 111 searches for the user name 1001 of the authenticated user, using as a key the user name 621 registered in the deletion information table 620.

In step S911, based on the result of the reference in step S910, the CPU 111 determines whether information (the user name) of the authenticated user is registered in the deletion information table 620 (this is called a "deletion determination"). As a result of the determination in step S911, if the CPU 111 determines that the information of the authenticated user is registered (YES in step S911), the processing proceeds to step S913. On the other hand, if the determination is NO (NO in step S911), the processing proceeds to step S912.

In step S912, the CPU 111 displays on the operation unit 150 (a job list) the bibliographic information acquired in step S907 (i.e., the bibliographic information of the authenticated user). For example, as illustrated in the job list screen 1100 in FIG. 11, which is displayed on the operation unit 150, the bibliographic information of a job that is input to the MFP 100 by the authenticated user (the user A) and has been successfully stored in the HDD 160 is displayed on the job list. After the process of step S912, the series of processes regarding FIG. 9 ends.

On the other hand, in step S913, the CPU 111 displays on the operation unit 150 (a job list) the bibliographic information acquired in step S907 (i.e., the bibliographic information of the authenticated user) and deletion information of a job associated with the authenticated user. For example, as illustrated in a job list screen 1210 illustrated in FIG. 12A, which is displayed on the operation unit 150, the bibliographic information of a job that is input to the MFP 100 by the authenticated user (the user A) and has been successfully stored in the HDD 160 is displayed on the job list. Further, on the job list screen 1210, a message 1211 is displayed, providing a notification of deletion information of a job associated with the authenticated user (i.e., a notification that there is a job input to the MFP 100 by the authenticated user and deleted from the HDD 160). After the process of step S913, the series of processes regarding FIG. 9 ends.

On the other hand, in step S914, the CPU 111 displays on the operation unit 150 (a job list) the bibliographic information acquired in step S907 (i.e., the bibliographic information of the authenticated user) and storage error information of a job associated with the authenticated user. For example, as illustrated in a job list screen 1220 in FIG. 12B, which is displayed on the operation unit 150, the bibliographic information of a job which is input to the MFP 100 by the authenticated user (the user A) and has been successfully stored in the HDD 160 is displayed on the job list. Further, on the job list screen 1220, a message 1221 is displayed, providing a notification of storage error information of a job associated with the authenticated user (i.e., a notification that there is a job that is input to the MFP 100 by the authenticated user and has failed to be stored when received). After the process of step S914, the series of processes regarding FIG. 9 ends.

This is the details of the series of processes in which the MFP 100 according to the first exemplary embodiment displays a job list of an authenticated user.

As described above in steps S901 to S904, the case has been described where the authentication for logging into the MFP 100 is performed based on user information input by a user on the authentication screen 1000 illustrated in FIG. 10. The present exemplary embodiment, however, is not limited to this. Alternatively, when a user is to log into the MFP 100, the authentication may be performed by reading user information, such as a user ID and a password, recorded in advance in an integrated circuit (IC) card.

In step S913, with reference to FIG. 12A, a case has been illustrated where the message 1211 is displayed on the job list screen 1210, thereby providing the notification of deletion information of a job associated with the authenticated user. The present exemplary embodiment, however, is not limited to this. Alternatively, the notification of deletion information of a job associated with the authenticated user may be provided by another method, as long as the authenticated user can easily recognize that there is a job input by the user and deleted from the HDD 160. For example, a pop-up screen (not illustrated) may be displayed on the operation unit 150 to provide the notification of deletion information of a job associated with the authenticated user. Alternatively, the notification of deletion information of the authenticated user may be provided by using an identifiable mark, a sound, or light. Also on the job list screen 1210, as the notification of deletion information of a job associated with the authenticated user, detailed information of the job deleted from the HDD 160 (e.g., the job name, the date and time when the job has been received, and the cause of deleting the job) may be further provided.

In step S914, with reference to FIG. 12B, the case has been illustrated where the message 1221 is displayed on the job list screen 1220, thereby providing the notification of storage error information of a job associated with the authenticated user. The present exemplary embodiment, however, is not limited to this. Alternatively, the notification of storage error information of a job associated with the authenticated user may be provided by another method, as long as the authenticated user can easily recognize that there is a job that is input by the user and has failed to be stored when received. For example, a pop-up screen (not illustrated) may be displayed on the operation unit 150 to provide the notification of storage error information of a job associated with the authenticated user. Alternatively, the notification of storage error information of the authenticated user may be provided by using an identifiable mark, a sound, or light. Also on the job list screen 1220, as the notification of storage error information of a job associated with the authenticated user, detailed information of the job that has failed to be stored when received (e.g., the job name, the date and time when the job has been received, and the cause of the failure of the storage of the job) may be further provided.

Figure 12C:
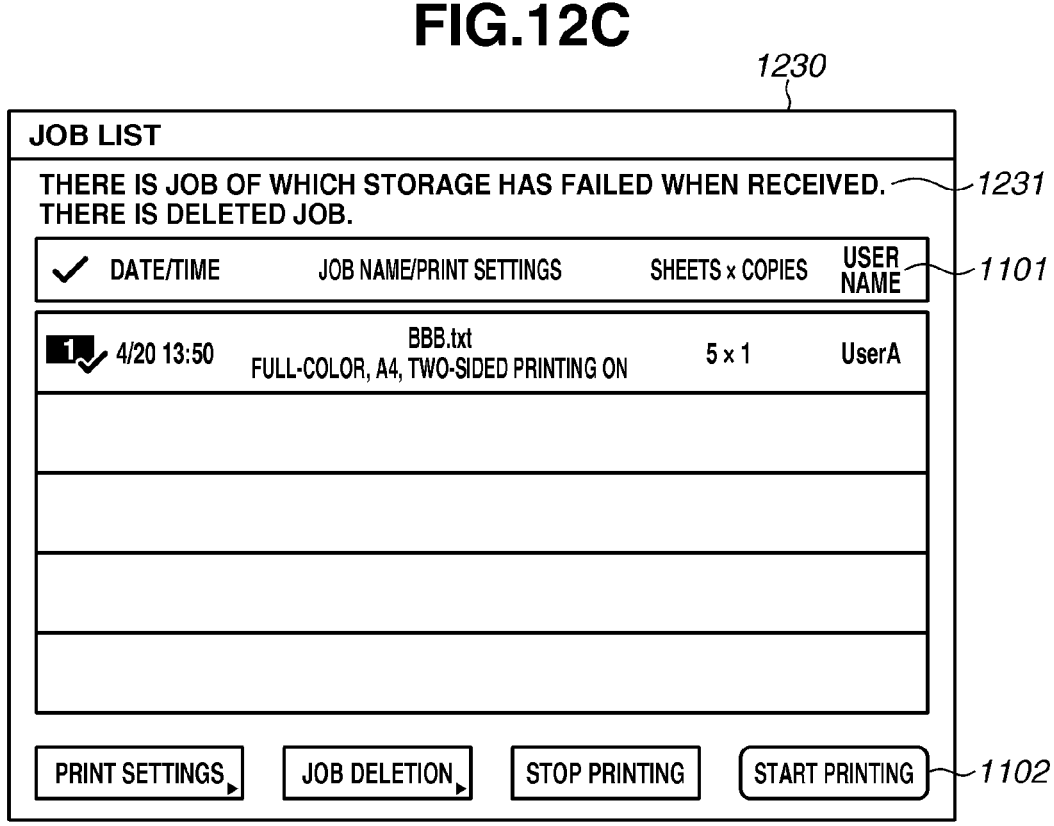

The case has been described where as a result of the determination in step S909, if the CPU 111 determines that the information of the authenticated user is registered in the error information table 610 (YES in step S909), the processing does not proceed to steps S910 to S913. The present exemplary embodiment, however, is not limited to this. Even if the CPU 111 determines that the information of the authenticated user is registered in the error information table 610, the processing may proceed to steps S910 to S913. Then, in step S911, if the CPU 111 determines that information of a job associated with the authenticated user is registered in the deletion information table 620 (YES in step S911), the CPU 111 may display on the operation unit 150 a job list screen 1230 as illustrated in FIG. 12C. On the job list screen 1230, a message 1231 is displayed, providing a notification of storage error information and deletion information of jobs associated with the authenticated user (i.e., a notification that there is a job that has failed to be stored when received, and there is also a deleted job). Further, to enable an alternate notification of the storage error information and the deletion information of the jobs associated with the authenticated user, the CPU 111 may provide the notification of the storage error information and the deletion information by performing blinking display or toggle display on the job list screen 1230.

Further, the case has been described where the job list of the authenticated user is displayed on the operation unit 150 of the MFP 100. The present exemplary embodiment, however, is not limited to this. Even if the job list of the authenticated user is displayed on the operation unit (not illustrated) of the PC 101, the series of processes regarding FIG. 9 can be similarly described. That is, on the operation unit of the PC 101, a notification indicating that "there is a job that is input by the authenticated user and is deleted from the HDD 160", or "there is a job that is input by the authenticated user and has failed to be stored when received" may be provided.

Next, with reference to a flowchart illustrated in FIG. 13, a description will be given of a series of processes in which the MFP 100 according to the first exemplary embodiment executes a job stored in the HDD 160. This processing is performed by the CPU 111 of the controller unit 110 executing the PDL function program read from the ROM 115 or the HDD 160 and loaded into the RAM 114. This processing is started, for example, while the job list screen 1100 illustrated in FIG. 11 is displayed on the operation unit 150.

In step S1301, the CPU 111 determines whether an instruction to execute a job stored in the HDD 160 has been received. For example, when the user selects desired bibliographic information from among the pieces of bibliographic information of jobs displayed on the job list screen 1100, and presses a print start button 1102, an instruction to execute the job can be received. As a result of the determination in step S1301, if the CPU 111 determines that an instruction to execute a job has been received (YES in step S1301), the processing proceeds to step S1302. On the other hand, if the determination is NO (NO in step S1301), the process of step S1301 is repeated until the CPU 111 determines that a job execution instruction is received.

In step S1302, the CPU 111 analyzes the bibliographic information of the job for which the execution instruction is received in step S1301, and the processing proceeds to step S1303.

In step S1303, the CPU 111 acquires from the HDD 160 the print data of the job for which the execution instruction is received in step S1301, and the processing proceeds to step S1304.

In step S1304, based on the bibliographic information (e.g., print setting information) analyzed in step S1302 and the print data acquired in step S1303, the CPU 111 executes the job for which the execution instruction is received in step S1301, and the processing proceeds to step S1305.

In step S1305, the CPU 111 references the error information table 610, which is stored in the HDD 160, and the processing proceeds to step S1306. When referencing the error information table 610, the CPU 111 searches for the user name 1001 of the authenticated user, using as a key the user name 611 registered in the error information table 610.

In step S1306, according to the result of the reference in step S1305, the CPU 111 determines whether information (user name) of the authenticated user is registered in the error information table 610. As a result of the determination in step S1306, if the CPU 111 determines that the information of the authenticated user is registered (YES in step S1306), the processing proceeds to step S1307. On the other hand, if the determination is NO (NO in step S1306), the processing proceeds to step S1308.

In step S1307, the CPU 111 deletes the information (user name) of the authenticated user from among the pieces of information (user names) of users registered in the error information table 610, and the processing proceeds to step S1308. For example, if the user name of the authenticated user is "user A", "user A" registered in the error information table 610 is deleted. According to the fact that the storage error information of the authenticated user is deleted from the error information table 610, the message 1221 of the storage error information displayed on the job list screen may be erased.

In step S1308, the CPU 111 references the deletion information table 620, which is stored in the HDD 160, and the processing proceeds to step S1309. When referencing the deletion information table 620, the CPU 111 searches for the user name 1001 of the authenticated user, using as a key the user name 621 registered in the deletion information table 620.

In step S1309, according to the result of the reference in step S1308, the CPU 111 determines whether the information (user name) of the authenticated user is registered in the deletion information table 620. As a result of the determination in step S1309, if the CPU 111 determines that the information of the authenticated user is registered (YES in step S1309), the processing proceeds to step S1310. On the other hand, if the determination is NO (NO in step S1309), the series of processes regarding FIG. 13 ends.

In step S1310, the CPU 111 deletes the information (user name) of the authenticated user from among the pieces of information (user names) of users registered in the deletion information table 620. For example, if the user name of the authenticated user is "user A", "user A" registered in the deletion information table 620 is deleted. According to the fact that the deletion information of the authenticated user is deleted from the deletion information table 620, the message 1211 of the deletion information displayed on the job list screen may be erased. After the process of step S1310, the series of processes regarding FIG. 13 ends.

This is the details of the series of processes in which the MFP 100 according to the first exemplary embodiment executes a job stored in the HDD 160.

The case has been described where the CPU 111 determines whether the information of the authenticated user is registered in the error information table 610 (step S1306), and then, the CPU 111 determines whether the information of the authenticated user is registered in the deletion information table 620 (step S1309). The present exemplary embodiment, however is not limited to this. Alternatively, the CPU 111 may determine whether the information of the authenticated user is registered in the deletion information table 620 (step S1309), and then, the CPU 111 may determine whether the information of the authenticated user is registered in the error information table 610 (step S1306). Yet alternatively, the CPU 111 may skip the determination of whether the information of the authenticated user is registered in the error information table 610 (step S1306), and the CPU 111 may only determine whether the information of the authenticated user is registered in the deletion information table 620 (step S1309).

The case has been described where according to the fact that an instruction to execute a job stored in the HDD 160 is received and then the job is executed, the CPU 111 deletes the storage error information or the deletion information of the authenticated user from the error information table 610 or the deletion information table 620. The present exemplary embodiment, however, is not limited to this. Alternatively, for example, according to the fact that desired bibliographic information is selected from among the pieces of bibliographic information of jobs displayed on the job list screen 1100, the CPU 111 may delete the storage error information or the deletion information of the authenticated user from the error information table 610 or the deletion information table 620.

Yet alternatively, according to the fact that desired bibliographic information is deleted according to an instruction from the user from among the pieces of bibliographic information of jobs displayed on the job list screen 1100, the CPU 111 may delete the storage error information or the deletion information of the authenticated user from the error information table 610 or the deletion information table 620.

Yet alternatively, according to the fact that a predetermined time elapses after display of the message 1221 or the message 1211 on the job list screen, the CPU 111 may delete the storage error information or the deletion information of the authenticated user from the error information table 610 or the deletion information table 620. Yet alternatively, according to the fact that an update button (not illustrated) on the job list screen 1100 is pressed by the user and then the job list is updated, the CPU 111 may delete the storage error information or the deletion information of the authenticated user from the error information table 610 or the deletion information table 620. That is, according to the fact that the job list is updated, the CPU 111 stops the above-described notification so that the message 1221 regarding the storage error information of the authenticated user or the message 1211 regarding the deletion information of the authenticated user is not displayed on the job list screen 1100.

Yet alternatively, according to the fact that the user logs out of the MFP 100, the CPU 111 may delete the storage error information or the deletion information of the authenticated user from the error information table 610 or the deletion information table 620. That is, the CPU 111 stops the above-described notification so that the message 1221 or the message 1211 regarding the authenticated user is not displayed on the job list screen 1100 according to the fact that the authenticated user logs out of the MFP 100 and then logs into the MFP 100 again.

As described above, in the first exemplary embodiment, if a job associated with user information is received and stored in the HDD 160 and the stored job is deleted after the storage period of the job elapses, the user information is registered in the deletion information table 620. If the job stored in association with the identification information of a user is deleted, the CPU 111 notifies the user that there is a deleted job, when the user has logged into the MFP 100. As described above, if jobs input by a user include a job deleted between when the user logs out of the MFP 100 and when the user logs into the MFP 100 next, the user can easily recognize the deletion of the job at the timing when the user logs into the MFP 100.

Further, if a job associated with user information is received and the received job has failed to be stored, the user information can also be registered in the error information table 610. That is, if the storage of the job associated with the identification information of a user has failed, the CPU 111 notifies the user that there is a job that has failed to be stored, when the user has logged into the MFP 100. As described above, if jobs input by a user include a job which has failed to be stored between when the user logs out of the MFP 100 and when the user logs into the MFP 100 next, the user can easily recognize the failure of the storage at the timing when the user logs into the MFP 100.

In the first exemplary embodiment, the case has been assumed where the authentication for logging into the MFP 100 is performed.

In a second exemplary embodiment, a case will be assumed where the authentication for logging into the MFP 100 is not performed. As the second exemplary embodiment, the following cases will be described. If a job associated with user information is received and stored in the HDD 160 and the stored job is deleted after the storage period of the job elapses, the value of a deletion flag is registered in a bibliographic information table (described below with reference to FIG. 16) stored in the HDD 160. Further, if a job associated with user information is received and the received job has failed to be stored, the CPU 111 registers storage failure information in the bibliographic information table. If, on the other hand, the received job has been successfully stored, the CPU 111 registers storage success information in the bibliographic information table. Then, according to the fact that a job list is displayed, a user is notified of a deleted job, a job that has failed to be stored, and a job that has been successfully stored, in association with the user information.

In the MFP 100 according to the second exemplary embodiment, the series of processes for storing the bibliographic information and print data of a received job in the HDD 160 is partially different from those of the first exemplary embodiment, i.e. the example of the control described above with reference to FIG. 4. Thus, with reference to FIG. 14, processes different from those of the first exemplary embodiment will be mainly described. Processes similar to those of the first exemplary embodiment are designated by the same step numbers and are not described in detail here. In the second exemplary embodiment, as illustrated in a bibliographic information table 1600 illustrated in FIG. 16, which is stored in the HDD 160, a user name 1601 and a storage result 1602 are registered as bibliographic information, in addition to the date and time 501, the storage location 502, and the print settings 503. The storage result 1602 refers to information of whether a received job has been successfully stored in the HDD 160.

Figure 14:
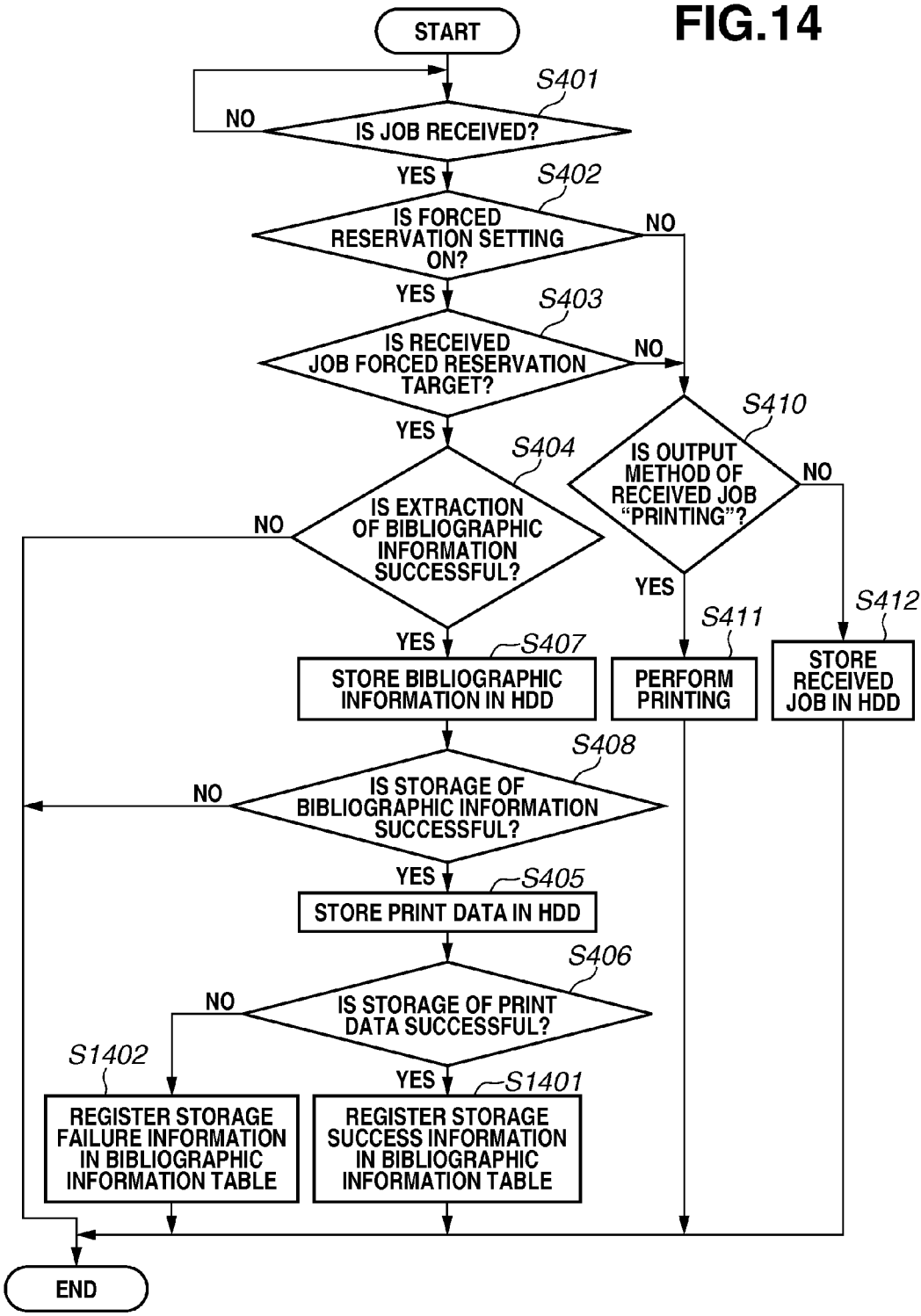
FIG. 14 is a flowchart illustrating an example of control according to a second exemplary embodiment.

As illustrated in FIG. 14, if the CPU 111 determines in step S404 that the bibliographic information has been successfully extracted (YES in step S404), the processing proceeds to step S407.

Then, as illustrated in FIG. 14, if the CPU 111 determines in step S408 that the bibliographic information has been successfully stored (YES in step S408), the processing proceeds to step S405. On the other hand, if the determination is NO (NO in step S408), the series of processes regarding FIG. 14 ends (the series of processes regarding FIG. 14 may end after the CPU 111 notifies the user that the storage of the bibliographic information has failed).

Then, as illustrated in FIG. 14, if the CPU 111 determines in step S406 that the print data has been successfully stored (YES in step S406), the processing proceeds to step S1401. On the other hand, if the determination is NO (NO in step S406), the processing proceeds to step S1402.

In step S1401, the CPU 111 registers storage success information ("OK") in the bibliographic information table 1600, which is stored in the HDD 160. The storage success information indicates that the received job has been successfully stored in the HDD 160. For example, as illustrated in the bibliographic information table 1600 in FIG. 16, "OK" (storage success information) is registered as the storage result 1602 of the job (with the job name "DDD.txt") input by the user B. After the process of step S1401, the series of processes regarding FIG. 14 ends.

In step S1402, the CPU 111 registers storage failure information ("NG") in the bibliographic information table 1600, which is stored in the HDD 160. The storage failure information indicates that the storage of the received job in the HDD 160 has failed. For example, as illustrated in the bibliographic information table 1600 in FIG. 16, "NG" (storage failure information) is registered as the storage result 1602 of the job (with the job name "EEE.jpg") input by the user C. After the process of step S1402, the series of processes regarding FIG. 14 ends.

This is the details of the processes different from those of the first exemplary embodiment, in the series of processes in which the MFP 100 according to the second exemplary embodiment stores the bibliographic information and print data of a received job in the HDD 160.

Further, in the MFP 100 according to the second exemplary embodiment, the series of processes for deleting (erasing), from the HDD 160, print data of a job of which the storage period has elapsed is partially different from those of the first exemplary embodiment, i.e. the example of the control described above with reference to FIG. 7. Thus, with reference to FIG. 15, processes different from those of the first exemplary embodiment will be mainly described. Processes similar to those of the first exemplary embodiment are designated by the same step numbers and are not described in detail here. In the second exemplary embodiment, as illustrated in the bibliographic information table 1600 stored in the HDD 160, a deletion flag 1603 is further registered as bibliographic information, in addition to the date and time 501, the storage location 502, and the print settings 503. The deletion flag 1603 refers to information indicating that a job stored in the HDD 160 is deleted.

As illustrated in FIG. 15, if the CPU 111 determines in step S707 that there is a job of which the storage period has elapsed (YES in step S707), the processing proceeds to step S1501. In step S1501, the CPU 111 deletes from the HDD 160 the print data of the job of which the storage period has elapsed, and the processing proceeds to step S1502.

In step S1502, the CPU 111 overwrites the value of the deletion flag 1603 with "true" in the bibliographic information table 1600 stored in the HDD 160. The initial value of the deletion flag 1603 is "false". If the value of the deletion flag 1603 is "false", this indicates that the job is stored in the HDD 160. If, on the other hand, the value of the deletion flag 1603 is "true", this indicates that the job stored in the HDD 160 is deleted. For example, as illustrated in the bibliographic information table 1600 in FIG. 16, the value of the deletion flag 1603 of the job (with the job name "DDD.txt") input by the user B is overwritten with "true". Further, for example, as illustrated in the bibliographic information table 1600, the value of the deletion flag 1603 of the job (with the job name "BBB.txt") input by the user A remains "false". On the other hand, the value of the deletion flag 1603 of the job (with the job name "AAA.ppt") input by the user A is not registered. This is because the storage result 1602 of this job is "NG" (i.e. the job has failed to be stored), and the received job is not stored in the HDD 160 in the first place. After the process of step S1502, the series of processes regarding FIG. 15 ends.

This is the details of the processes different from those of the first exemplary embodiment, in the series of processes in which the MFP 100 according to the second exemplary embodiment deletes (erases), from the HDD 160, the print data of a job of which the storage period has elapsed.

Figure 17:
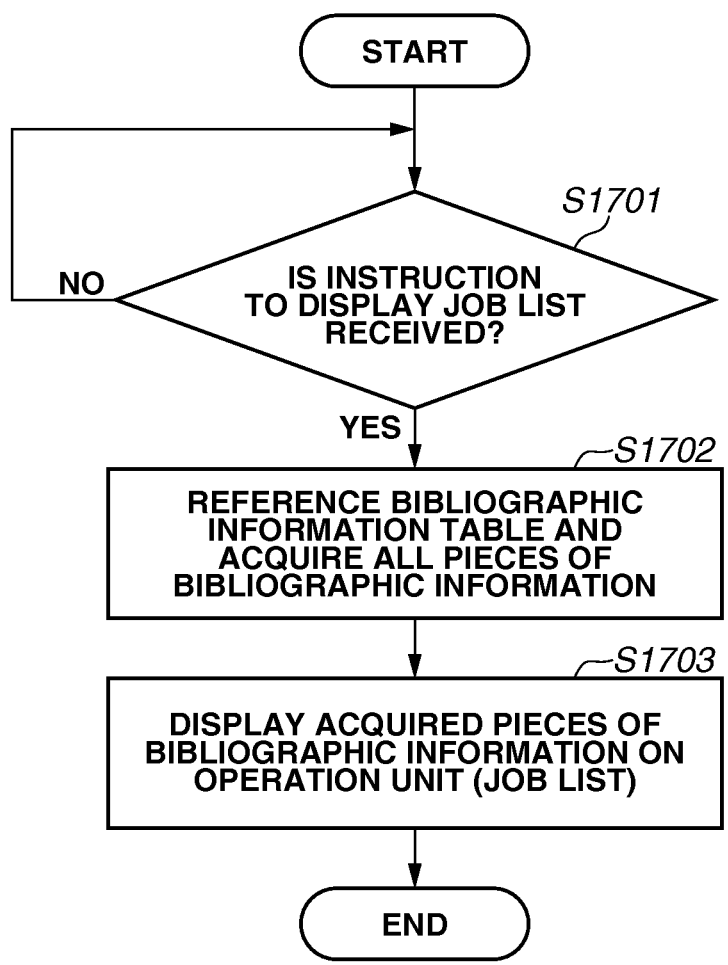
FIG. 17 is a flowchart illustrating an example of control according to the second exemplary embodiment.

Next, with reference to a flowchart illustrated in FIG. 17, a description will be given of a series of processes in which the MFP 100 according to the second exemplary embodiment displays a job list. This processing is performed by the CPU 111 of the controller unit 110 executing the UI function program read from the ROM 115 or the HDD 160 and loaded into the RAM 114. The following description will be given on the assumption that in the MFP 100 according to the second exemplary embodiment, the authentication for logging into the MFP 100 is not performed. As illustrated in a job list screen 1800 in FIG. 18, a job list according to the second exemplary embodiment displays the storage result 1602 of a job (print data) of which the bibliographic information has been successfully stored, in association with the user name 1601 in the form of a list. The job list also displays information of a job (having the value "true" as the deletion flag 1603) deleted from the HDD 160, in association with the user name 1601 in the form of a list. The job list screen 1800 is displayed on the operation unit 150.

In step S1701, the CPU 111 determines whether an instruction to display a job list has been received. The job list screen 1800 is, for example, called by the user pressing a button (not illustrated) displayed on the operation unit 150. As a result of the determination in step S1701, if the CPU 111 determines that a display instruction has been received (YES in step S1701), the processing proceeds to step S1702. On the other hand, if the determination is NO (NO in step S1701), the process of step S1701 is repeated until a display instruction is received.

In step S1702, the CPU 111 references the bibliographic information table 1600 illustrated in FIG. 16, which is stored in the HDD 160, and acquires all pieces of bibliographic information. Then, the processing proceeds to step S1703. In step S1702, the user name 1601, the storage result 1602, and the deletion flag 1603 are acquired as the pieces of bibliographic information, in addition to the date and time 501, the storage location 502, the print settings 503.

In step S1703, the CPU 111 displays on the operation unit 150 (a job list) the pieces of bibliographic information acquired in step S1702. For example, as illustrated in the job list screen 1800 in FIG. 18, it is understood that the storage result 1602 of the job that is input to the MFP 100 by the user A, and has the job name "AAA.ppt" is a failure ("NG" 1802). On the other hand, it is understood that the storage result 1602 of the job that is input to the MFP 100 by the user A and has the job name "BBB.txt" is a success ("OK" 1801). On the other hand, it is understood that the storage result 1602 of the job that is input to the MFP 100 by the user A and has the job name "CCC.doc" is a success ("OK" 1801), but the job is deleted ("deleted" 1803) from the HDD 160.

The user can select a job of which the storage result 1602 is a success ("OK" 1801) and which is not deleted from the HDD 160, and issues an instruction to execute the job. On the other hand, for a job of which the storage result 1602 is a failure ("NG" 1802), the user can change the settings of the job, and input the job from the PC 101 to the MFP 100 again. Further, for a job of which the storage result 1602 is a success ("OK" 1801) but which is deleted from the HDD 160, the user can change the setting of the storage period, and input the job from the PC 101 to the MFP 100 again. After the process of step S1703, the series of processes regarding FIG. 17 ends.

This is the details of the series of processes in which the MFP 100 according to the second exemplary embodiment displays a job list. The case has been illustrated where on the job list screen 1800 illustrated in FIG. 18, "OK" 1801 is displayed to indicate that the storage of a received job has succeeded, and "NG" 1802 is displayed to indicate that the storage of a received job has failed. The present exemplary embodiment, however, is not limited to this. Alternatively, for example, a pop-up screen (not illustrated) may be displayed on the job list screen 1800 to notify the user of a storage result, as long as the user can easily recognize that the storage of a job has succeeded, or the storage of a job has failed. Yet alternatively, the user may be notified of a storage result by using an identifiable mark, a sound, or light. Also, the user may be further notified of, as a storage result, detailed information of a job that has failed to be stored when received (e.g., the cause of the failure of the storage of the job).

Further, the case has been illustrated where "deleted" 1803 is displayed on the job list screen 1800 to indicate that a job is deleted from the HDD 160. The present exemplary embodiment, however, is not limited to this. Alternatively, for example, a pop-up screen (not illustrated) may be displayed on the job list screen 1800 to notify the user of deletion information, as long as the user can easily recognize that a job is deleted from the HDD 160. Alternatively, the user may be notified of deletion information by using an identifiable mark, sound, or light. Also, the user may be further notified of the cause of deleting a job from the HDD 160 (for example, deletion of a job due to the elapse of the storage period).

Further, the case has been described where the job list is displayed on the operation unit 150 of the MFP 100. The present exemplary embodiment, however, is not limited to this. Even if the job list is displayed on the operation unit (not illustrated) of the PC 101, the series of processes regarding FIG. 17 can be similarly described. That is, on the operation unit of the PC 101, the user may be notified of "information of a job deleted from the HDD 160", "information of a job that has failed to be stored", or "information of a job that has been successfully stored".

As described above, in the second exemplary embodiment, if a job associated with user information is received and stored in the HDD 160, and the stored job is deleted, the value of a deletion flag is overwritten with "true" in the bibliographic information table 1600. Then, according to the fact that a job list is displayed, a user is notified of the job deleted from the HDD 160, in association with the user information. As described above, at the timing when a job list is displayed, the user can easily recognize information of a job deleted from the HDD 160 among jobs input by the user himself/herself. Further, at the timing when a job list is displayed, the user can easily recognize information of a job that has failed to be stored, and information of a job that has been successfully stored, among jobs input by the user himself/herself.

In a third exemplary embodiment, similarly to the second exemplary embodiment, a case is assumed where the authentication for logging into the MFP 100 is not performed. The following cases will be described. If a job associated with user information is received and stored in the HDD 160 and the stored job is deleted after the storage period of the job elapses, the value of a deletion flag is registered in a job history table (described below with reference to FIG. 21) stored in the HDD 160. Further, if a job associated with user information is received and the received job has failed to be stored, the CPU 111 registers storage failure information in the job history table. If, on the other hand, a job associated with user information is received and the received job has been successfully stored, the CPU 111 registers storage success information in the job history table. Then, according to the fact that a screen for presenting a history of jobs to a user (hereinafter referred to as "job history") is displayed, the user is notified of a deleted job, a job that has failed to be stored, and a job that has been successfully stored, in association with user information.

Figure 21:
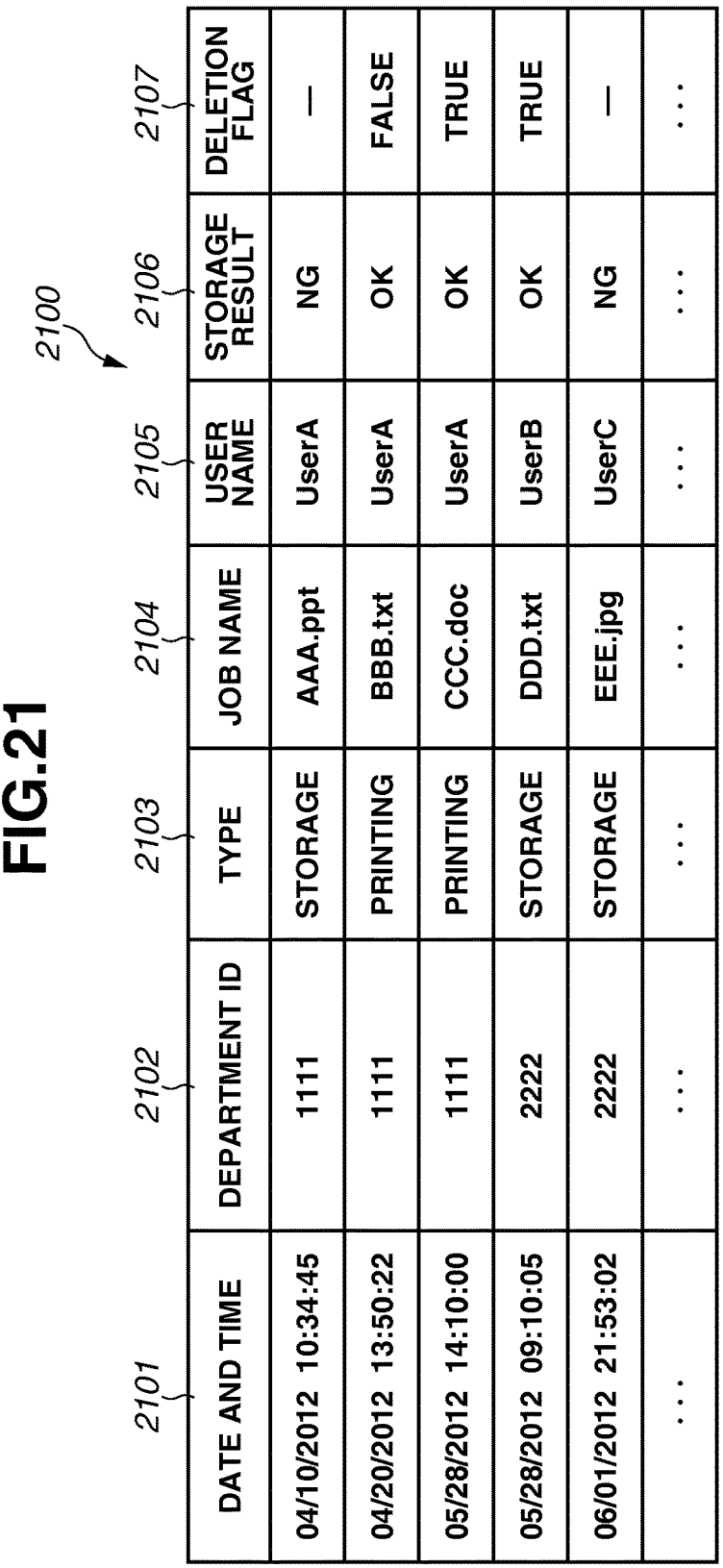
FIG. 21 illustrates an example of a table according to the third exemplary embodiment.

As illustrated in a job history table 2100 in FIG. 21, in job history information, as history information of jobs of which the bibliographic information has been successfully extracted, the date and time 2101 when a job has been received, a type 2103 of the received job, and a job name 2104 of the received job are managed, for example. Further, a department ID 2102 of the user having input the job, a user name 2105 of the user having input the job, a storage result 2106 of the received job, and a deletion flag 2107 are managed. The job history table 2100 is stored in the HDD 160.

In the MFP 100 according to the third exemplary embodiment, the series of processes for storing the bibliographic information and print data of a received job in the HDD 160 is partially different from those of the first exemplary embodiment, i.e. the example of the control described above with reference to FIG. 4. Thus, with reference to FIG. 19, processes different from those of the first exemplary embodiment will be mainly described. Processes similar to those of the first and second exemplary embodiments are designated by the same step numbers and are not described in detail here.

Figure 19:
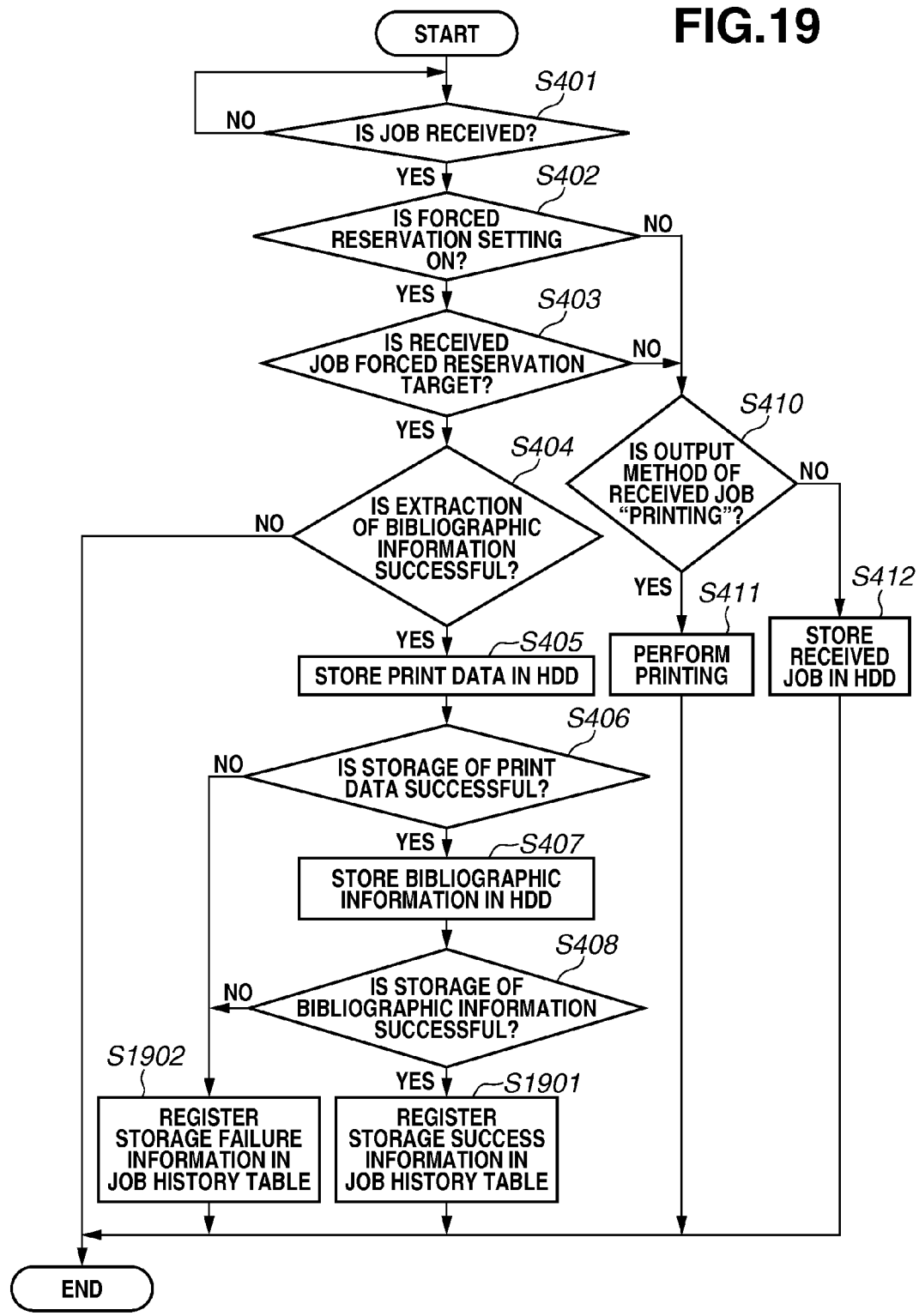
FIG. 19 is a flowchart illustrating an example of control according to a third exemplary embodiment.

As illustrated in FIG. 19, if the CPU 111 determines in step S408 that the bibliographic information has been successfully stored (YES in step S408), the processing proceeds to step S1901. On the other hand, if the determination is NO (NO in step S408), the processing proceeds to step S1902.

In step S1901, the CPU 111 registers storage success information ("OK") in the job history table 2100 stored in the HDD 160. The storage success information indicates that the received job has been successfully stored in the HDD 160. For example, as illustrated in the job history table 2100 in FIG. 21, "OK" (storage success information) is registered as the storage result 2106 of the job (with the job name "DDD.txt") input by the user B. After the process of step S1901, the series of processes regarding FIG. 19 ends.

In step S1902, the CPU 111 registers storage failure information ("NG") in the job history table 2100 stored in the HDD 160. The storage failure information indicates that the received job has failed to be stored in the HDD 160. For example, as illustrated in the job history table 2100 in FIG. 21, "NG" (storage failure information) is registered as the storage result 2106 of the job (with the job name "EEE.jpg") input by the user C. After the process of step S1902, the series of processes regarding FIG. 19 ends. This is the details of the processes different from those of the first exemplary embodiment, in the series of processes in which the MFP 100 according to the third exemplary embodiment stores the bibliographic information and print data of a received job in the HDD 160.

Further, in the MFP 100 according to the third exemplary embodiment, the series of processes for deleting (erasing), from the HDD 160, print data of a job of which the storage period has elapsed is partially different from those of the first exemplary embodiment, i.e. the example of the control described above with reference to FIG. 7. Thus, with reference to FIG. 20, processes different from those of the first exemplary embodiment will be mainly described. Processes similar to those of the first exemplary embodiment are designated by the same step numbers and are not described in detail here.

Figure 20:
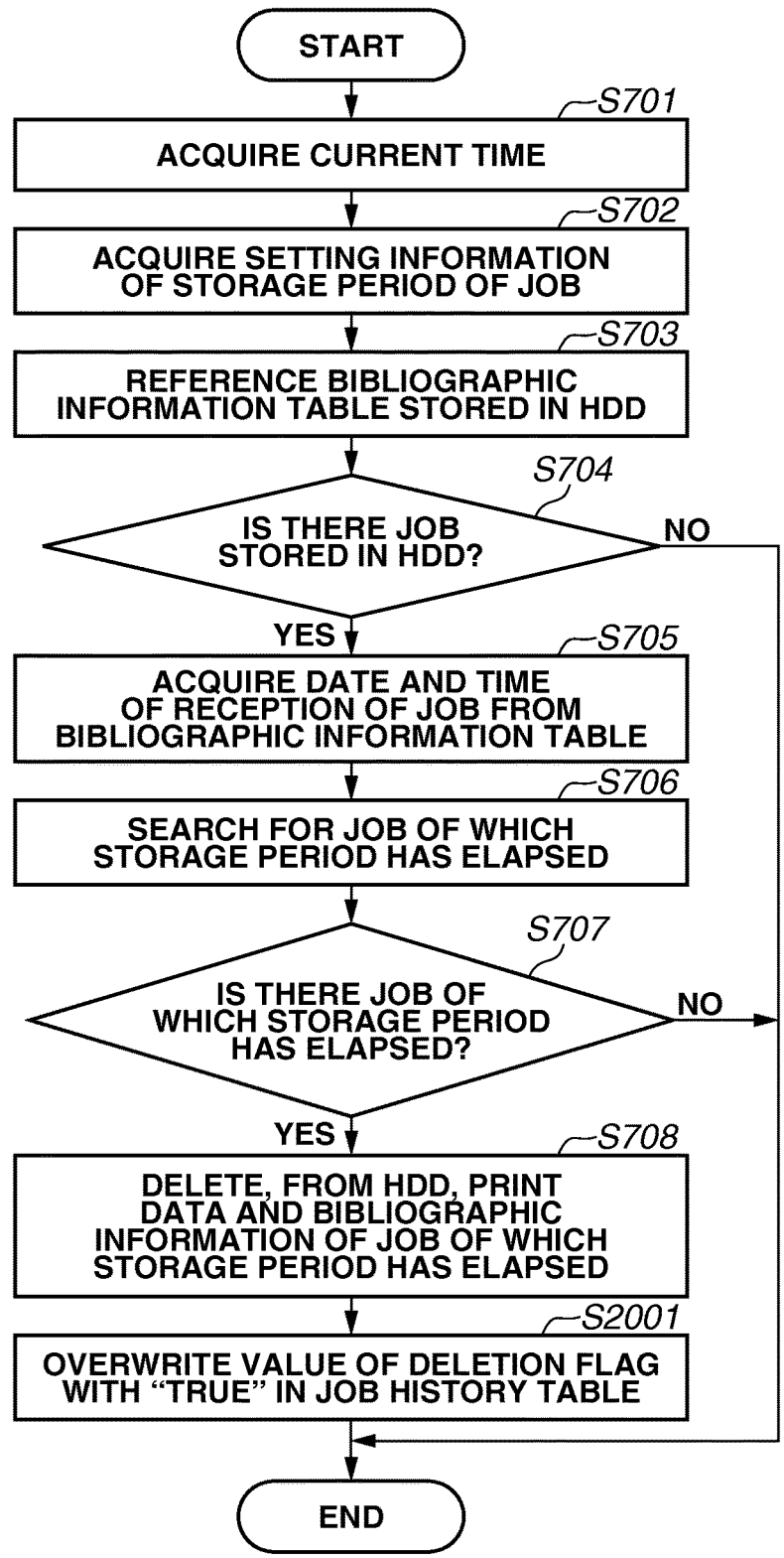
FIG. 20 is a flowchart illustrating an example of control according to the third exemplary embodiment.

As illustrated in FIG. 20, in step S708, the CPU 111 deletes from the HDD 160 the print data and bibliographic information of the job of which the storage period has elapsed. Then, the processing proceeds to step S2001.

In step S2001, the CPU 111 overwrites the value of the deletion flag 2107 with "true" in the job history table 2100 stored in the HDD 160. The deletion flag 2107 is information indicating that a job stored in the HDD 160 is deleted. The initial value of the deletion flag 2107 is "false". If the value of the deletion flag 2107 is "false", this indicates that a job is stored in the HDD 160. If, on the other hand, the value of the deletion flag 2107 is "true", this indicates that a job stored in the HDD 160 is deleted. For example, as illustrated in the job history table 2100 in FIG. 21, the value of the deletion flag 2107 of the job (with the job name "DDD.txt") input by the user B is overwritten with "true". Further, for example, as illustrated in the job history table 2100, the value of the deletion flag 2107 of the job (with the job name "BBB.txt") input by the user A remains "false". The value of the deletion flag 2107 of the job (with the job name "AAA.ppt") input by the user A is not registered. This is because the storage result 2106 of this job is "NG" (i.e. the job has failed to be stored), and the received job is not stored in the HDD 160 in the first place. After the process of step S2001, the series of processes regarding FIG. 20 ends.

This is the details of the processes different from those of the first exemplary embodiment, in the series of processes in which the MFP 100 according to the third exemplary embodiment deletes (erases), from the HDD 160, the print data of a job of which the storage period has elapsed.

Figure 22:
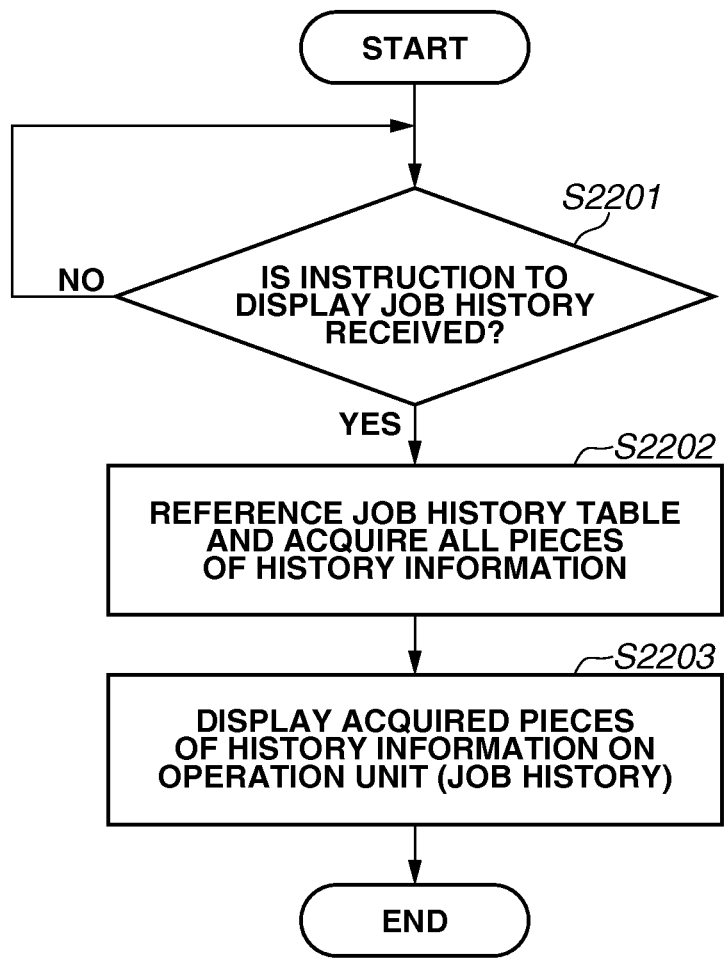
FIG. 22 is a flowchart illustrating an example of control according to the third exemplary embodiment.

Next, with reference to a flowchart illustrated in FIG. 22, a description will be given of a series of processes in which the MFP 100 according to the third exemplary embodiment displays a job history. This processing is performed by the CPU 111 of the controller unit 110 executing the UI function program read from the ROM 115 or the HDD 160 and loaded into the RAM 114. The following description will be given on the assumption that in the MFP 100 according to the third exemplary embodiment, the authentication for logging into the MFP 100 is not performed. As illustrated in a job history screen 2300 in FIG. 23, a job history according to the third exemplary embodiment displays history information (e.g., printing history information and storage history information) of jobs of which the bibliographic information has been successfully extracted, in association with a user name 2301 in the form of a list. The job history screen 2300 is displayed on the operation unit 150.

In step S2201, the CPU 111 determines whether an instruction to display a job history has been received. The job history screen 2300 illustrated in FIG. 23 is, for example, called by the user pressing a button (not illustrated) displayed on the operation unit 150. As a result of the determination in step S2201, if the CPU 111 determines that a display instruction has been received (YES in step S2201), the processing proceeds to step S2202. On the other hand, if the determination is NO (NO in step S2201), the process of step S2201 is repeated until a display instruction is received.

In step S2202, the CPU 111 references the job history table 2100 illustrated in FIG. 21, which is stored in the HDD 160, and acquires all pieces of history information. Then, the processing proceeds to step S2203. In step S2202, the user name 2105, the storage result 2106, and the deletion flag 2107 are acquired as the pieces of history information, in addition to the date and time 2101, the department ID 2102, the type 2103, and the job name 2104.

In step S2203, the CPU 111 displays on the operation unit 150 (job history) the pieces of history information acquired in step S2202. For example, as illustrated in the job history screen 2300 in FIG. 23, it is understood that a storage result 2302 of the job that is input to the MFP 100 by the user A and has the job name "AAA.ppt" is a failure ("NG"). On the other hand, it is understood that the storage result 2302 of the job that is input to the MFP 100 by the user B and has the job name "DDD.txt" is a success ("OK"), but a deletion result 2303 indicates that the job is deleted from the HDD 160.

The user can select a job of which the storage result 2302 is a success ("OK") and which is not deleted from the HDD 160, and issue an instruction to execute the job. On the other hand, for a job of which the storage result 2302 is a failure ("NG"), the user can change the settings of the job and then input the job from the PC 101 to the MFP 100 again. Further, for a job deleted from the HDD 160, the user can change the setting of the storage period and then input the job from the PC 101 to the MFP 100 again. After the process of step S2203, the series of processes regarding FIG. 22 ends.

This is the details of the series of processes in which the MFP 100 according to the third exemplary embodiment displays a job history. The case has been illustrated where on the job history screen 2300 in FIG. 23, "OK" is displayed to indicate that a received job has been successfully stored, and "NG" is displayed to indicate that a received job has failed to be stored. The present exemplary embodiment, however, is not limited to this. Alternatively, a pop-up screen (not illustrated) may be displayed on the job history screen 2300 to notify the user of a storage result, as long as the user can easily recognize that a job has been successfully stored, or a job has failed to be stored. Yet alternatively, the user may be notified of a storage result by using an identifiable mark, a sound, or light. Also, the user may be further notified of, as a storage result, detailed information of a job that has failed to be stored when received (e.g., the cause of the failure of the storage of the job).

Further, the case has been illustrated where "deleted" is displayed on the job history screen 2300 to indicate that a job is deleted from the HDD 160. The present exemplary embodiment, however, is not limited to this. Alternatively, for example, a pop-up screen (not illustrated) may be displayed on the job history screen 2300 to notify the user of deletion information, as long as the user can easily recognize that a job is deleted from the HDD 160. Alternatively, the user may be notified of deletion information by using an identifiable mark, a sound, or light. Also, the user may be further notified of the cause of deleting a job from the HDD 160 (for example, deletion of the job due to the elapse of the storage period).

The case has been described where a job history is displayed on the operation unit 150 of the MFP 100. The present exemplary embodiment, however, is not limited to this. Even if the job history is displayed on the operation unit (not illustrated) of the PC 101, the series of processes regarding FIG. 22 can be similarly described. That is, on the operation unit of the PC 101, the user may be notified of "information of a job deleted from the HDD 160", "information of a job that has failed to be stored", and "information of a job that has been successfully stored".

As described above, in the third exemplary embodiment, if a job associated with user information is received and stored in the HDD 160 and the stored job is deleted, the value of the deletion flag 2107 is overwritten with "true" in the job history table 2100. Then, according to the fact that a job history is displayed, a user is notified of a job deleted from the HDD 160, in association with the user information. As described above, at the timing when a job history is displayed, the user can easily recognize information of a job deleted from the HDD 160 among jobs input by the user himself/herself. Further, at the timing when a job history is displayed, the user can easily recognize information of a job that has failed to be stored, and information of a job that has been successfully stored, among jobs input by the user himself/herself.

The exemplary embodiments of the present invention is not limited to the above. Various modifications (including the organic combinations of the exemplary embodiments) can be made based on the spirit of the present invention, and are not excluded from the scope of the present invention.

For example, the present exemplary embodiments have been described taking the PC 101 as an example of an external apparatus. Alternatively, the external apparatus may be a mobile information terminal such as a personal digital assistant (PDA) or a smartphone, a network connection device, or an external dedicated apparatus.

Further, for example, in the present exemplary embodiments, the CPU 111 of the controller unit 110 of the MFP 100 performs the above various types of control. Alternatively, a print control apparatus such as an external controller having a housing separate from the MFP 100 may be configured to perform some or all of the above various types of control.

Further, the case has been described where in the bibliographic information table 500 illustrated in FIG. 5, the bibliographic information table 1600 illustrated in FIG. 16, and the job history table 2100 illustrated in FIG. 21, "the date and time when a job has been received" is managed. Alternatively, for example, "the date and time when a job has been input" may be managed.

Further, for example, the user (administrator) may be able to check detailed information of a job deleted from the HDD 160 (e.g., the job name, the date and time when the job has been received, and the cause of deleting the job) by tracking (analyzing) an operation log. Similarly, the user (administrator) may be able to recognize detailed information of a job that has failed to be stored when received (e.g., the job name, the date and time when the job has been received, and the cause of the failure of the storage of the job) by tracking (analyzing) an operation log.

Further, for example, in the present exemplary embodiments, the case has been described where a single MFP 100 stores print data and bibliographic information of a received job in the HDD 160 and executes the job. The present exemplary embodiments, however, are not limited thereto. Alternatively, if a plurality of MFPs 100 is connected together so as to be able to communicate with one another via a network such as the LAN 102, the plurality of MFPs 100 may include a storage apparatus for storing print data of a received job, and a bibliography server apparatus for registering (storing) bibliographic information of the job. The CPU 111 of another one of the MFPs 100 (an output apparatus) may be able to issue a request to acquire the print data stored in the storage apparatus and the bibliographic information stored in the bibliography server apparatus and then execute the job.

Embodiments of the present invention can also be realized by a computer of a system or apparatus that reads out and executes computer executable instructions recorded on a storage medium (e.g. non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-208406, filed Oct. 9, 2014, which is hereby incorporated by reference herein in its entirety.

What is claimed is:

1. An image forming apparatus capable of communicating with an external device, the image forming apparatus using a display device that displays a screen and using a storage that stores data, the image forming apparatus comprising:
   a controller having a processor which executes instructions stored in a memory or having a circuitry, the controller being configured to:
      acquire first print data, which is subjected to be stored so as to be printed according to a print instruction, from the external device;
      determine whether the first print data is stored;
      in a case where the first print data is determined to be stored, cause the storage to store the first print data to make it possible to issue the print instruction;
      in a case where the first print data is determined not to be stored, register first information regarding the first print data that has not been stored in association with user information acquired from the first print data without causing the storage to store the first print data;
      acquire second print data from the external device; and
      based on a predetermined condition, after the second print data is registered, delete the second print data stored in the storage without a user instruction and register second information regarding the second print data that has been deleted in association with user information acquired from the second print data,
   wherein the controller, on a basis that a user associated with the first information is currently in a login state, causes the display device to display a first notification message which indicates the first print data has not been stored,
   wherein the controller, on a basis that a user associated with the second information is currently in a login state, causes the display device to display a second notification message which indicates the second print data has been deleted, and
   wherein the controller, on a basis that a user associated with not only the second information but also the first information is currently in a login state, causes the display device to display not the second notification message but the first notification message.

2. The image forming apparatus according to claim 1, wherein the controller causes one notification information among a plurality of information including the first notification message and the second notification message to be displayed in a predetermined area on a job list screen.

3. The image forming apparatus according to claim 1, wherein the predetermined condition is a condition based on lapse of time.

4. The image forming apparatus according to claim 1, wherein the controller is further configured to delete the first information and/or the second information after the first notification message is displayed or the second notification message is displayed.

5. The image forming apparatus according to claim 1, wherein the controller deletes the first information and/or the second information according to execution of a job stored in the storage after the first notification message is displayed or the second notification message is displayed.

6. The image forming apparatus according to claim 1, wherein the controller deletes the first information and/or the second information according to logout from the image forming apparatus, by the user, after the first notification message is displayed or the second notification message is displayed.

7. The image forming apparatus according to claim 1, wherein the controller deletes the first information and/or the second information according to elapse of a predetermined time after the first notification message is displayed or the second notification message is displayed.

8. The image forming apparatus according to claim 1, wherein the image forming apparatus is capable of using an image forming device configured to form an image on a sheet, wherein the controller causes the image forming device to form an image based on the first print data or the second print data stored in the storage in accordance with a print instruction given by a user.

9. A control method in an image forming apparatus capable of communicating with an external device, the image forming apparatus using a display device that displays a screen and using a storage that stores data, the control method comprising:
   acquiring first print data which is subjected to be stored so as to be printed according to a print instruction from the external device;
   determining whether the first print data is stored;
   in a case where the first print data is determined to be stored, causing the storage to store the first print data to make it possible to issue the print instruction;
   in a case where the first print data is determined not to be stored, registering first information regarding the first print data that has not been stored in association with user information acquired from the first print data without causing the storage to store the first print data;
   acquiring second print data from the external device; and
   based on a predetermined condition, after the second print data is registered, deleting second print data stored in the storage without a user instruction and storing second information regarding the second print data that has been deleted in association with user information acquired from the second print data,
   wherein, on a basis that a user associated with the first information is currently in a login state, causing the display device to display a first notification message which indicates the first print data has not been stored,
   wherein, on a basis that a user associated with the second information is currently in a login state, causing the display device to display a second notification message which indicates the second print data has been deleted, and
   wherein, on a basis that a user associated with not only the second information but also the first information is currently in a login state, causing the display device to display not the second notification message but the first notification message.

* * * * *